United States Patent
Senda et al.

(10) Patent No.: US 7,084,848 B2
(45) Date of Patent: Aug. 1, 2006

(54) LIQUID CRYSTAL DISPLAY DEVICE, ELECTROLUMINESCENT DISPLAY DEVICE, METHOD OF DRIVING THE DEVICES, AND METHOD OF EVALUATING SUBPIXEL ARRANGEMENT PATTERNS

(75) Inventors: Kouji Senda, Nagaokakyo (JP); Yutaka Nanno, Takarazuka (JP); Shin-itsu Takehashi, Shijonawate (JP)

(73) Assignee: Matsushita Electric Industrial Co., LTD, Osaka (JP)

( * ) Notice: Subject to any disclaimer, the term of this patent is extended or adjusted under 35 U.S.C. 154(b) by 322 days.

(21) Appl. No.: 09/984,847

(22) Filed: Oct. 31, 2001

(65) Prior Publication Data

US 2002/0047822 A1   Apr. 25, 2002

(30) Foreign Application Priority Data

| Jan. 22, 2000 | (JP) | ............................. 2001-013187 |
| Oct. 31, 2000 | (JP) | ............................. 2000-331694 |
| Dec. 19, 2000 | (JP) | ............................. 2000-384840 |
| Jan. 22, 2001 | (JP) | ............................. 2001-013179 |
| Mar. 5, 2001  | (JP) | ............................. 2001-060057 |
| May 31, 2001  | (JP) | ............................. 2001-165535 |

(51) Int. Cl.
  G09G 3/36   (2006.01)
  G02F 1/1333  (2006.01)

(52) U.S. Cl. ........................ 345/92; 345/87; 349/158

(58) Field of Classification Search .......... 345/87–104, 345/1.1–111, 204–215; 349/1–202
See application file for complete search history.

(56) References Cited

U.S. PATENT DOCUMENTS

| 5,235,448 A | 8/1993 | Suzuki et al. ............... 359/59 |
| 5,296,847 A | 3/1994 | Takeda et al. ................ 345/92 |
| 5,365,284 A | 11/1994 | Matsumoto et al. ........ 348/793 |
| 6,072,451 A | 6/2000 | Mano et al. ................... 345/89 |
| 6,127,995 A | 10/2000 | Furuhashi et al. ............ 345/96 |
| 6,335,778 B1 | 1/2002 | Kubota et al. ............... 349/151 |
| 6,456,267 B1 * | 9/2002 | Sato et al. ..................... 345/92 |

FOREIGN PATENT DOCUMENTS

| JP | 61-042591 | 3/1986 |
| JP | 02-157815 | 6/1990 |
| JP | 04-066918 | 3/1992 |
| JP | 06-324306 | 11/1994 |
| JP | 07-318901 | 12/1995 |
| JP | 10-039277 | 2/1998 |
| JP | 10-068931 | 3/1998 |
| JP | 2000-155561 | 6/2000 |

* cited by examiner

*Primary Examiner*—Sumati Lefkowitz
*Assistant Examiner*—Srilakshmi K Kumar
(74) *Attorney, Agent, or Firm*—Steptoe & Johnson LLP

(57) ABSTRACT

An active matrix liquid crystal display device has a plurality of unit pixels being arranged in a matrix configuration, each unit pixel being divided into a plurality of subpixels. Each of the subpixels has a subpixel electrode, a pixel transistor connected to the subpixel electrode, and a voltage controlling capacitor connected to the subpixel electrode. A voltage controlling capacitor line for supplying a compensation voltage signal is connected to the voltage controlling capacitor so that after the writing to the subpixel has been completed, the potential of the compensation voltage signal is varied to modulate the potential of the subpixel electrode to be a predetermined voltage, using the voltage controlling capacitor. Such combining of spatial dithering attained by a pixel-dividing technique and a capacitively-coupled driving method eliminates the need for digital-to-analog converter circuits, attains gray scale display based on a digital image signal, and achieves a reduction in power consumption.

32 Claims, 40 Drawing Sheets

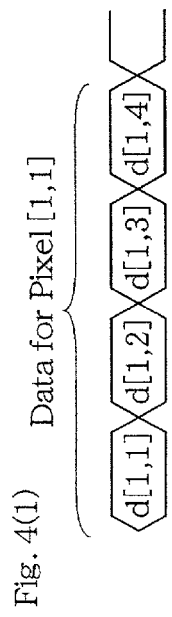
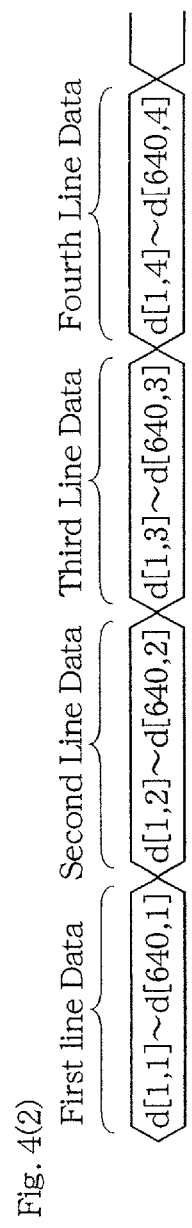

Fig. 25

| R Region | G Region | B Region |
|---|---|---|
| R8 | G16 | B8 |
| R4 | G8 | B4 |
| R2 | G4 | B2 |
| R1 | G2 \| G1 \| G2 | B1 |
| R2 | G4 | B2 |
| R4 | G8 | B4 |
| R8 | G16 | B8 |

US 7,084,848 B2

LIQUID CRYSTAL DISPLAY DEVICE, ELECTROLUMINESCENT DISPLAY DEVICE, METHOD OF DRIVING THE DEVICES, AND METHOD OF EVALUATING SUBPIXEL ARRANGEMENT PATTERNS

BACKGROUND OF THE INVENTION (1) Field of the Invention

The present invention relates to a liquid crystal display device and an electroluminescent (EL) display device, which are applicable to so-called mobile information devices or the like. The invention also relates to methods of driving the display devices. More particularly, the invention relates to a liquid crystal display device and an EL display device in which halftone display is performed by a spatial dithering method, and to methods of driving the devices and of evaluating subpixel arrangement patterns.

(2) Description of the Prior Art

A conventional pixel circuit configuration for an active matrix liquid crystal display panel is shown in FIG. 39 (hereafter, the example of active matrix liquid crystal display panel depicted in FIG. 39 is referred to as "the first prior-art example"). FIG. 39 shows source lines (data lines) SL, gate lines (scanning lines) GL, a pixel transistor Tr, a storage capacitor C, a pixel electrode 155, and a storage capacitor line 156. Insofar as the input image data signal for obtaining gray scale display has an analog signal format, this pixel configuration can attain display images of good quality. Recent mobile information devices, however, utilize digital signal formats for the image data, and therefore, when the configuration of the first prior-art example is adopted for driver circuits of the mobile information devices, digital-to-analog converter circuits are required to convert digital image input signals to analog signals. This incurs high manufacturing cost and considerable increase in power consumption.

In view of such a problem in the first prior-art example, Japanese Unexamined Patent Publication No. 10-68931 discloses a technique in which a unit pixel is divided into a plurality of subpixels and spatial dithering is employed for displaying images using digital image data signals (this example is hereafter referred to as "second prior-art example"). This prior-art technique is detailed below referring to FIG. 40. FIG. 40 shows source lines SL, gate lines GL, pixel transistors Tr1, Tr2, Tr3, and Tr4, and pixel electrodes 155a, 155b, 155c, and 155d. The pixel electrodes 155a, 155b, 155c, and 155d are formed so that the area ratio of the pixel electrodes corresponds to the weight ratio of the corresponding binary bits of digital image data. This configuration eliminates the need for converting digital image input signals to analog signals, and therefore digital signals can be used for achieving gray scale display. Thus, the configuration makes it possible to prevent increases in manufacturing cost and in power consumption which are caused by providing digital-to-analog converter circuits.

However, the second prior-art example has the following problems:

(1) In the second prior-art example, both the scan driver circuit and the data driver circuit are formed of polycrystalline silicon. For this reason, when the number of pixels increases, that is, when the horizontal scanning time shortens as the number of pixels increases, the data driver circuit does not operate at a sufficient speed because the characteristics of polycrystalline silicon are inferior to those of single crystalline silicon.

(2) In the second prior-art example, in the case where each unit pixel is divided into a plurality of subpixels, the wiring configuration of data lines and scanning lines is such that the data lines are individually wired and the scanning lines are commonly wired. This structure significantly increases the number of connecting pins in the driver circuits, especially when each unit pixel needs to be further divided for R (red), G (green), and B (blue) colors to attain color image display. As a result, the incidence of connection defects increases, resulting in image quality degradation which include display defects.

(3) In the second prior-art example, the power consumption can be reduced by performing gray scale display with the use of digital signals. However, further power reduction is necessary when the second prior-art example is desired to be used for information terminal devices, particularly for displays in mobile telephones.

(4) In the second prior-art example, the pixel transistors Tr1, Tr2, Tr3, and Tr4 drive the pixel electrode 155a, 155b, 155c, and 155d, respectively, so as to perform gray scale display. Consequently, depending on the relationship between the gray level in a certain unit pixel and that in an adjacent unit pixel, stripe-like shaded patterns (persistent patterns) appear on the display screen, degrading image quality of the liquid crystal panel.

SUMMARY OF THE INVENTION

Accordingly, it is an object of the present invention to provide a liquid crystal display device that is free from the foregoing problems of the prior art, performs gray scale display without the use of a digital-to-analog converter circuit, reduces the power consumption and occupied area of the peripheral circuits, and performs gray scale display with good image quality, and to provide a method of driving the liquid crystal display device.

It is another object of the invention to provide a liquid crystal display device, an EL display device, and methods of driving the devices which improve the display image quality by suppressing the occurrence of persistent patterns.

It is further another object of the invention to provide a method of evaluating subpixels arrangement patterns which makes it possible to easily select the optimum subpixel arrangement pattern.

These and other objects are accomplished, in accordance with a first aspect of the invention, by providing a liquid crystal display device comprising a scan driver circuit for supplying a scanning signal to scanning lines, a data driver circuit for supplying digital image data to data lines, the digital image data having a plurality of binary bits, and a plurality of unit pixels arranged in a matrix configuration, the liquid crystal display device wherein:

each of the unit pixels has a plurality of subpixels, each of the subpixels comprising a subpixel electrode, a switching element connected to the subpixel electrode, and a voltage controlling capacitor connected to the subpixel electrode;

a plurality of voltage controlling capacitor lines for supplying a compensation voltage signal are provided, each of the voltage controlling capacitor lines being connected to the voltage controlling capacitors in each of the unit pixels; and after writing to the subpixels has been completed, the potentials of the subpixel electrodes are modulated by varying the potential of the compensation voltage signal.

This configuration realizes a liquid crystal display device in which gray scale display is performed using an independent capacitively coupled driving method. The use of an independent capacitively coupled driving method for the driving method makes it possible to reduce the power consumption.

In a second aspect of the invention, the liquid crystal display device of the first aspect may be such that, in each of the unit pixels, the scanning lines are individually provided for the respective subpixels therein, while one of the data lines is commonly provided for all the subpixels therein.

By employing this wiring configuration, the number of the connections of wiring lines is not much larger than that in the second prior-art example even if the invention is applied to a full color liquid crystal display device in which R, G, B subpixels are additionally provided. Therefore, the problems of the second prior-art example are solved, which include an increase in defective electrical contacts caused by the considerable increase in the number of connecting pins, image quality degradation such as display defects, and so forth.

In a third aspect of the invention, the liquid crystal display device of the second aspect may be such that each of the subpixel electrodes has an electrode area that corresponds to the weight of the corresponding binary bit of the digital image data.

This configuration achieves improved image quality in gray scale display.

In a fourth aspect of the invention, the liquid crystal display device of the second aspect may be such that each of the switching elements in each of the unit pixels is a thin film transistor, and the thin film transistor has an ON current performance that corresponds to the weight of the corresponding binary bit of the digital image data.

With this configuration, the pixel transistors are provided with ON current performances corresponding to the sizes of the subpixel electrodes, and thereby the image data are sufficiently written thereto. The ON current performance of the pixel transistor may be set by varying the channel width or by varying both the channel width and the channel length.

In a fifth aspect of the invention, the liquid crystal display device of the second aspect may be such that each of the voltage controlling capacitors in each of the unit pixels has a capacitance value that corresponds to the weight of the corresponding binary bit of the digital image data.

This configuration minimizes variation in the electrode potential in each subpixel, thereby improving image quality.

In a seventh aspect of the invention, the liquid crystal display device of the second aspect may further comprise, in each subpixel, a storage capacitor formed between each of the subpixel electrode and a scanning line immediately upstream thereof.

This configuration makes it possible to obtain a required load capacitance in each of the plurality of subpixels. Thereby, the holding characteristics in the subpixels improve, thus preventing image quality degradation.

In a seventh aspect of the invention, the liquid crystal display device of the sixth aspect may be such that the capacitance value of the voltage controlling capacitor is set to be a value in the range of 0.6 to 1.4 times that of the capacitance Cc defined by the following equation:

$$Cc = \{(Vbias/Vepp - Vbias)\} \cdot (Clc + Cgd)$$

where Vbias is the amount of the pixel voltage variation caused by the variation of the compensation voltage, Vepp is the amplitude of the compensation voltage signal, Clc is the liquid crystal capacitance, and Cgd is the parasitic capacitance of the switching element.

When the voltage controlling capacitance is set to satisfy Equation (1) above, a sufficient contrast is obtained at a minimum power consumption and at a minimum amplitude.

In an eighth aspect of the invention, the liquid crystal display device of the second aspect may be such that in each of the unit pixels, the centroids of the areas of the subpixel electrodes are disposed substantially at the same position.

This configuration makes it possible to suppress the occurrence of persistent patterns, thereby achieving a smooth gray scale image rendering in the image display device and improving image quality.

In a ninth aspect of the invention, the liquid crystal display device of the eighth aspect may be such that at least one of the subpixel electrodes is divided so as to form two substantially rectangular shaped portions arranged substantially parallel to each other, and the two substantially rectangular shaped portions of the one of the subpixel electrodes are disposed so as to sandwich at least one of the rest of the subpixel electrodes.

This configuration also suppresses the occurrence of persistent patterns and improves image quality.

According to a tenth aspect of the invention, a liquid crystal display device according to the ninth aspect may be such that the two substantially rectangular shaped portions of the one of the subpixel electrodes are electrically connected to each other.

If the two substantially rectangular shaped portions were not electrically connected, it would be necessary to provide a switching element for each of the portions, but as in this configuration, if they are electrically connected, only one switching element is required for the driving thereof. Therefore, a reduction in the number of switching elements is achieved. Moreover, the occupied area by the switching element is reduced and the aperture ratio is correspondingly increased.

According to an 11th aspect of the invention, a liquid crystal display device according to the eighth aspect may be such that at least one of the subpixel electrodes has a substantially square frame shape, and the one of the subpixel electrodes having a substantially square frame shape is disposed so as to surround at least one of the rest of the subpixel electrodes.

This configuration also suppresses the occurrence of persistent patterns and improves image quality.

According to a 12th aspect of the invention, a liquid crystal display device according to the eighth aspect may be such that in each of the unit pixels, a subpixel electrode having the largest electrode area among the subpixels electrodes has a substantially square frame shape, and at least one of the rest of the subpixel electrodes is disposed inside the square frame shaped subpixel electrode and has two substantially rectangular shaped portions arranged substantially parallel to each other.

If the two substantially rectangular shaped portions were not electrically connected, it would be necessary to provide a switching element for each of the portions, but when the subpixel electrodes have such shapes as the above-described configuration, only one switching element is required for each subpixel to be driven. Therefore, a reduction in the number of switching elements is achieved. Moreover, the occupied area by the switching element is reduced and the aperture ratio is correspondingly increased.

In a 13th aspect of the invention, the liquid crystal display device of the second aspect may be such that the data driver circuit is formed of single crystal silicon, and the scan driver circuit is formed of polycrystalline silicon.

When the data driver circuit is formed of single crystal silicon, the power consumption is remarkably reduced than the case where the data driver circuit is formed of polycrystalline silicon. In addition, even when the pixel number is large and a horizontal scanning period is short, the data driver circuit formed of single crystal silicon makes it possible to operate the device at a necessary speed.

In a 14th aspect of the invention, the liquid crystal display device of the 13th aspect may be such that the switching element is a thin film transistor comprising polycrystalline silicon.

In a 15th aspect of the invention, the liquid crystal display device of the second aspect may be such that the subpixel electrode is a reflective electrode.

In a 16th aspect of the invention, the liquid crystal display device of the second aspect may be such that a portion of the subpixel electrode serves as a transmissive electrode.

In a 17th aspect of the invention, the liquid crystal display device of the second aspect may be such that:

each of the unit pixels is provided with two of the voltage controlling capacitor lines;

one of the two voltage controlling capacitor lines is connected to the voltage controlling capacitors in the odd-numbered rows of the subpixels in each of the unit pixels, and;

the other one of the two voltage controlling capacitor lines is connected to the voltage controlling capacitors in the even-numbered rows of the subpixels in each of the unit pixels.

This configuration attains an interlaced scan liquid crystal display device. By employing interlaced scan, the amount of the data to be written per scan is ½ of that for a frame, and therefore, the power consumption is reduced.

In an 18th aspect of the invention, the liquid crystal display device of the 17th aspect may be such that the total area of the subpixel electrodes in the odd-numbered rows of the subpixels in a row of the unit pixels is substantially equal to the total area of the subpixel electrodes in the even-numbered rows of the subpixels in a row of the unit pixels.

The above-described configuration makes it possible to reduce flicker.

In a 19th aspect of the invention, the liquid crystal display device of the 17th aspect may be such that all the rows of the subpixels have substantially the same total area of the subpixel electrodes in a row of the unit pixels.

The above-described configuration makes it possible to reduce flicker.

In a 20th aspect of the invention, the liquid crystal display device of the second aspect may be such that the scanning lines and the voltage controlling capacitor lines are formed of the same wiring material.

According to a 21st aspect of the invention, there is provided an electroluminescent display device comprising a scan driver circuit for supplying a scanning signal to scanning lines, a data driver circuit for supplying digital image data to data lines, and a plurality of unit pixels arranged in a matrix configuration, the liquid crystal display device wherein:

each of the unit pixels has a plurality of subpixels each comprising a subpixel electrode and a switching element connected to the subpixel electrode; and in each of the unit pixels, the centroids of the areas of the subpixel electrodes are disposed substantially at the same position.

The above-described configuration realizes an EL display device that achieves similar effects and advantages to those of the eighth aspect of the invention.

In a 22nd aspect of the invention, the electroluminescent display device of the 21st aspect may be such that at least one of the subpixel electrodes is divided so as to form two substantially rectangular portions arranged substantially parallel to each other, and the two substantially rectangular-shaped portions arranged substantially parallel to each other are disposed so as to sandwich at least one of the rest of the subpixel electrodes.

The above-described configuration realizes an EL display device that achieves similar effects and advantages to those of the ninth aspect of the invention.

In a 23rd aspect of the invention, the electroluminescent display device of the 22nd aspect may be such that the two substantially rectangular-shaped portions arranged substantially parallel to each other are electrically connected to each other.

The above-described configuration realizes an EL display device that achieves similar effects and advantages to those of the tenth aspect of the invention.

In a 24th aspect of the invention, the electroluminescent display device of the 21st aspect may be such that at least one of the subpixel electrodes has a substantially square frame shape, and the one of the subpixel electrodes having a substantially square frame shape is disposed so as to surround at least one of the rest of the subpixel electrodes.

The above-described configuration realizes an EL display device that achieves similar effects and advantages to those of the 11th aspect of the invention.

In a 25th aspect of the invention, the electroluminescent display device of the 21st aspect may be such that a subpixel electrode having the largest electrode area among the subpixels electrodes in each of the unit pixels has a substantially square frame shape, and at least one of the rest of the subpixel electrodes is disposed inside the square frame shaped subpixel electrode and has two substantially rectangular-shaped portions arranged substantially parallel to each other.

The foregoing construction realizes an EL display device that achieves similar effects and advantages to those of the 12th aspect of the invention.

According to a 26th aspect of the invention, there is provided a method of driving a liquid crystal display device, the liquid crystal display device comprising a plurality of unit pixels each having a plurality of subpixels, each subpixel comprising a subpixel electrode, a switching element connected to the subpixel electrode, and a voltage controlling capacitor to which a compensation voltage signal is supplied via a voltage controlling capacitor line, the method comprising:

(a) sequentially selecting scanning lines wired to the respective subpixels in a given row of the unit pixels;

(b) applying a positive polarity image signal voltage to the subpixel electrodes;

(c) after all the subpixels in the given row of the unit pixels have been written, supplying a high potential compensation voltage signal to the voltage controlling capacitor line to shift the potential of each of the subpixel electrodes to a high potential side;

(d) subsequent to the step (c), sequentially selecting scanning lines wired to the respective subpixels in another given row of the unit pixels;

(e) applying a negative polarity image signal voltage to the subpixel electrodes;

(f) after all the subpixels in the another given row of the unit pixels have been written, supplying a low potential compensation voltage signal to the voltage controlling capacitor line to shift the potential of each of the subpixel electrodes to a low potential side; and (g) repeating the steps (a) to (f) for all the scanning lines, whereby the polarities of applied voltage to liquid crystal are reversed every other row of the unit pixels.

This driving method achieves a reduction in the number of voltage controlling capacitor lines, thereby increasing the aperture ratio and simplifying the driving control. In addition, the horizontal scanning frequency is reduced and the power consumption is reduced. Furthermore, γ characteristic linearity is improved, and thus, so is image quality.

In a 27th aspect of the invention, the method of the 26th aspect may be such that gray scale display is performed using a combination of a spatial dithering method and an error diffusion method.

By using an error diffusion method, this method makes it possible to eliminate the occurrences of persistent patterns and flicker, which are inherent in spatial dithering, thus achieving an improvement in image quality.

In a 28th aspect of the invention, the method of the 26th aspect may be such that gray scale display is performed using a combination of a spatial dithering method and a pulse wide modulation (PWM) driving method.

This method makes the layouting of subpixel electrodes easy and achieves 64-gray level display or multi-gray level display with even more gray levels.

According to a 29th aspect of the invention, there is provided a method of driving a liquid crystal display device, the device comprising a plurality of unit pixels arranged in a matrix configuration, each of the unit pixels comprising a plurality of subpixels, each subpixel individually comprising a subpixel electrode, a switching element connected to the subpixel electrode, and a voltage controlling capacitor, the method wherein the polarities written to the subpixels are reversed every other scanning line.

The above-described method makes it possible to reduce flicker as small as possible.

According to a 30th aspect of the invention, there is provided a method of driving a liquid crystal display device, the device comprising a plurality of unit pixels each having a plurality of subpixels, each subpixel comprising a voltage controlling capacitor, the device wherein the voltage controlling capacitors in an odd-numbered row are connected to a voltage controlling capacitor line, whereas the voltage controlling capacitors in an even-numbered row are connected to another voltage controlling capacitor line, the method comprising:

providing a frame comprising a first field and a second field;

in the first field, (a) sequentially scanning the subpixels in odd-numbered rows in the unit pixels, (b) applying an image signal to the subpixel electrodes, and (c) after the subpixels have been written, varying the potential of voltage controlling capacitor lines for the odd-numbered rows to modulate the potentials of the subpixel electrodes in the odd-numbered rows; and in the second field, (d) sequentially scanning the subpixels in even-numbered rows in the unit pixels, (e) applying an image signal to the subpixel electrodes, and (f) after the subpixels have been written, varying the potential of voltage controlling capacitor lines for the even-numbered rows to modulate the potentials of the subpixel electrodes in the even-numbered rows.

By such a interlaced scan method, the amount of the data to be written per scan is ½ of that for a frame, and thereby the power consumption is reduced.

According to a 31st aspect of the invention, there is provided a method of driving a liquid crystal display device comprising:

driving the device by the method of the 30th aspect to perform interlaced scan when the device is in a still picture display mode; and driving the device by progressive scan when the device is in a moving picture display mode.

When a still picture is displayed, the power consumption is reduced by performing interlaced scan, while when a moving picture is displayed, a @Clear image with increased resolution is obtained by performing progressive scan.

In a 32nd aspect of the invention, there is provided an information terminal device comprising a liquid crystal display device according to the second aspect of the invention.

In a 33rd aspect of the invention, there is provided an information terminal device comprising an electroluminescent display device according to the 21st aspect of the invention.

In a 34th aspect of the invention, there is provided a method of evaluating a subpixel arrangement pattern comprising:

storing subpixel arrangement patterns to be evaluated in a storing means, the subpixel arrangement patterns corresponding to gray scale levels;

subsequent to the step of storing, reading an original image for evaluation by a reading means;

reading out a subpixel arrangement pattern corresponding to the gray scale levels of the original image from the storing means to perform image processing whereby the original image is converted into gray scale display data based on the subpixel arrangement pattern; and subsequent to the step of reading out, outputting the converted gray scale display data by a printing/display means to determine whether a display defect exists by visually observing the output image.

With this evaluating method, an optimum subpixel arrangement pattern is easily determined.

The present invention achieves various advantageous effects as described above. These advantageous effects are summarized as follows.

(1) The provision of a digital-to-analog converter circuit is unnecessary, and gray scale display is possible directly based on digital video data. Accordingly, digital-to-analog converter circuits as necessary in the prior art are eliminated, and thereby power consumption is reduced.

(2) The occupied area and the power consumption of the peripheral driver circuits are reduced, and gray scale display with good image quality is achieved.

(3) The number of voltage controlling capacitor lines is smaller than that in a configuration in which each voltage controlling capacitor is individually connected to each voltage controlling capacitor line. Therefore, an improvement in aperture ratio and a simplification of device drive controlling are achieved. In addition, the horizontal scanning frequency is reduced, and power consumption is thereby reduced. It may be possible to individually provide a storage capacitor line for each subpixel to achieve inversion driving for every other row of subpixels, but when employing a capacitively coupled driving method as in the present invention, such a configuration causes inferior γ characteristic linearity because of the pixel electrode potential modulation by the capacitive coupled driving. For this problem, the device is configured such that inversion driving is performed every other row of unit pixels. This improves γ characteristic linearity, thereby improving image quality.

(4) By providing a storage capacitor between a subpixel electrode and the upstream scanning line, device reliability and display image quality are improved.

(5) Interlaced scan is performed such that a single frame is constituted by two fields, field A and field B, and in the field A, the image data for the odd-numbered rows are displayed whereas in the field B, the image data for the even-numbered rows are displayed. Thereby, the amount of the writing data per scan is reduced to ½ of that for the entire image, and thus a reduction in power consumption is achieved in comparison with progressive scan.

(6) It is possible to employ a configuration in which the centroid of a pixel electrode in a subpixel is disposed near the centroid of another pixel electrode in the subpixel. Thereby the occurrence of persistent patterns is prevented, a smooth gray level rendering in the image display device is achieved, and thus the image quality is improved.

BRIEF DESCRIPTION OF THE DRAWINGS

For a more complete understanding of the present invention, and the advantages thereof, reference is now made to the following descriptions taken in conjunction with the accompanying drawings, in which;

FIGS. 4(1) and 4(2) show data strings of image data;

FIG. 25 is a schematic view showing the configuration of the pixels in a liquid crystal display device in accordance with Embodiment 13, where color image display is performed;

DESCRIPTION OF THE PREFERRED EMBODIMENTS

Embodiment 1

Figure 1:
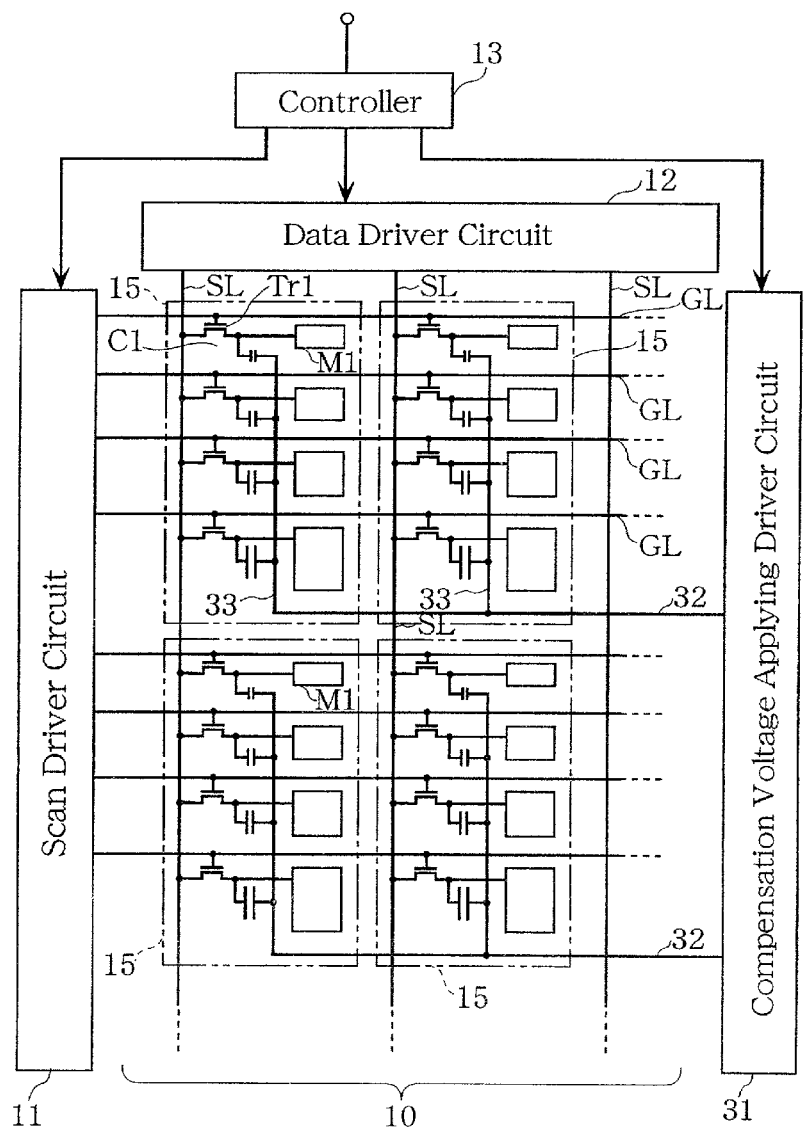
FIG. 1 is a circuit diagram of a liquid crystal display device in accordance with Embodiment 1.
Figure 2:
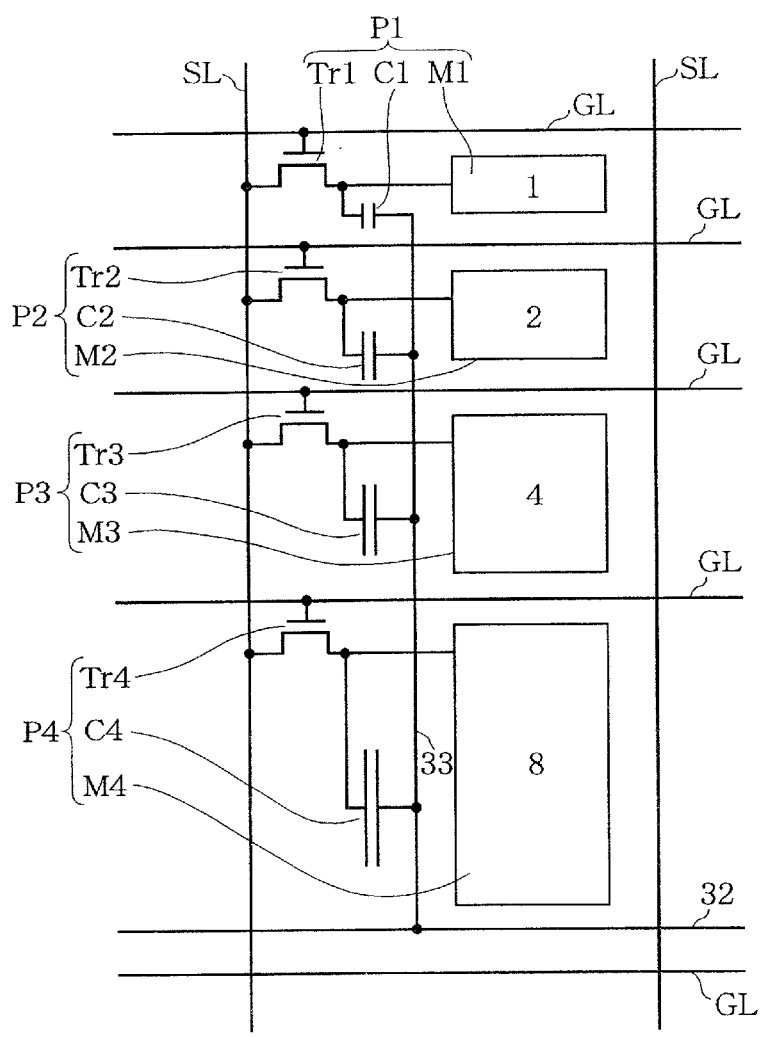
FIG. 2 is a circuit diagram showing the configuration of a unit pixel in the liquid crystal display device of Embodiment 1.

FIG. 1 shows a circuit diagram of a liquid crystal display device according to Embodiment 1 of the present invention. FIG. 2 shows a circuit diagram illustrating the configuration of a unit pixel. This liquid crystal display device is of a digital driving system type by which gray scale display is performed using a digital image signal. The digital image signal have 4-bit data format. The device is of an active matrix type and is capable of displaying 16 gray levels. Referring now to FIGS. 1 and 2, an example of the specific configuration of the device is discussed below. FIG. 1 illustrates a liquid crystal display unit 10 comprising a plurality of unit pixels 15 arranged in a matrix configuration, a scan driver circuit 11, a data driver circuit 12, a controller 13, and a compensation voltage-applying driver circuit 31 for supplying a compensation voltage signal to voltage controlling capacitor lines 32.

The liquid crystal display unit 10 has a plurality of source lines (data lines) SL and a plurality of gate lines (scanning lines) GL arranged in a matrix configuration. The controller 13 outputs a control signal, such as a clock signal and a latch pulse, to the scan driver circuit 11, the data driver circuit 12, and the compensation voltage-applying driver circuit 31, in order to control these circuits so that image display is performed.

The liquid crystal display device of Embodiment 1 employs a spatial dithering method, and for this purpose, each of the unit pixels 15 comprises a plurality of subpixels (four subpixels in the present Embodiment 1) P1, P2, P3, and P4. The subpixel P1 has a subpixel electrode M1, a pixel transistor Tr1 composed of a thin film transistor (TFT), and a voltage controlling capacitor C1 for carrying out capacitively coupled driving. The details of the capacitively coupled driving method will be provided later. Likewise, the rest of the subpixels P2–P4 also have subpixel electrodes M2–M4, pixel transistors Tr2–Tr4, and voltage controlling capacitors C2–C4.

In the present Embodiment 1, the subpixel electrodes M1–M4 are so formed that the electrode area ratio thereof corresponds to the ratio of the weights of the corresponding binary bits of digital image data. That is, the area of the subpixel electrode M1: the area of the subpixel electrode M2: the area of the subpixel electrode M3: the area of the subpixel electrode M4=1:2:4:8. The first bit of the 4-bit image data corresponds to the subpixel P1, the second bit to the subpixel P2, the third bit to the subpixel P3, and the fourth bit to the subpixel P4. Thus, the sizes of the subpixel electrodes are such that correspond to the weights of the corresponding binary bits of the digital signals, and as a result, according to the digital image data, 16 gray level display is achieved. It is to be noted here that the term "the electrode area" of a pixel electrode means 20 that an area of the pixel electrode that effectively contributes to light modulation. For example, in a transmissive type device, "the electrode area" is an effective area obtained by subtracting an area covered by any light blocking member from the actual electrode area.

Each unit pixel 15 has a wiring configuration such that gate lines GL are individually wired to the respective subpixels and a source line SL is commonly connected to all the subpixels in the unit pixel. Such a wiring configuration for configuring the subpixels eliminates the problems in the prior art example (Japanese Unexamined Patent Publication No. 10-68931). In the present Embodiment 1, the data driver circuit 12 is formed of single crystal silicon, and therefore, the pitch for the connections of the source lines SL cannot be made large and the number of wiring lines that can be connected thereto is inherently restricted. However, the scan driver circuit 11 is formed of polycrystalline silicon and is thus free from such a restriction, and therefore a large number of gate lines GL can be connected thereto. Hence, the present Embodiment 1 is particularly suitable for such a wiring configuration that the gate lines GL are individually provided for the respective subpixels whereas the source lines SL are commonly provided.

The liquid crystal display device of the present Embodiment 1 employs a capacitively coupled driving method (in a capacitively coupled driving method, the potential of the opposing electrode is constant) as disclosed in Japanese Unexamined Patent Publication Nos. 2-157815 and 10-39277. The specific configuration is as follows. Voltage controlling capacitor lines 32 are connected to the respective unit pixels 15, and one of the electrodes of each of voltage controlling capacitors C1 to C4 is connected to the corresponding voltage controlling capacitor line 32 via a common connecting line 33. This configuration achieves prevention of image quality degradation caused by punch-through voltage (pixel electrode voltage decrease caused by parasitic capacitance). Moreover, by independently providing the voltage controlling capacitor lines 32, the voltage in the scan driver circuit 11 is reduced in comparison with the configuration in which a scanning signal and a compensation voltage are superimposed in a gate line (such as the one disclosed in Japanese Unexamined Patent Publication No. 2-157815).

Though the details are given later, the compensation voltage applying circuit 31 is, as shown in FIG. 6, configured such that, after the writing to all the subpixels in a unit pixel has been completed, the pixel electrode potentials in the respective subpixels are modulated at one time by varying the compensation voltage signal. Thereby, the number of voltage controlling capacitor lines is smaller than, for example, that in a configuration in which voltage controlling capacitor lines 32 are wired to the respective subpixels and the voltage controlling capacitors C1 to C4 are independently connected to the respective voltage controlling capacitor lines 32. Consequently, an increase in aperture ratio and a simple driving control are achieved. Moreover, the horizontal scanning frequency is reduced, and power consumption is thereby reduced (the horizontal scanning here means that, in a capacitively coupled driving method as employed in the present invention, the potentials of the subpixel electrodes are modulated by varying the compensation voltage after the writing to the subpixels has been completed). Furthermore, in a driving method such as described in the present embodiment, which employs a capacitively coupled driving method, when inversion driving is carried out for every subpixel row, (when a subpixel is regarded as a normal single pixel, this operation corresponds to 1H inversion driving) gray scale characteristic (y characteristic) does not become linear but becomes a non-linear, wave-like shape because of the capacitive coupling. This degrades the device's image quality. For this problem, when inversion driving is carried out for each unit pixel row (when a subpixel is regarded as a normal single pixel, this operation corresponds to 4H inversion driving) as in the present embodiment, a linear y characteristic is obtained and thereby image quality is improved.

It is noted here that in place of the use of the compensation voltage applying circuit 31, the scan driver circuit 11 may have a function of applying a compensation voltage by connecting the voltage controlling capacitor lines 32 to the scan driver circuit 11. This achieves a reduction in the circuit area corresponding to the occupied area by the compensation voltage applying circuit 31.

Here, the area ratio of the subpixel electrodes is set to be 1:2:4:8, and the voltage controlling capacitors are accordingly made to have corresponding capacitance values. Specifically, the capacitance value of the voltage controlling capacitor C1: the capacitance value of the voltage controlling capacitor C2: the capacitance value of the voltage controlling capacitor C3: the capacitance value of the voltage controlling capacitor C4=1:2:4:8. Thereby, variations in the pixel electrode potentials are suppressed and good image quality is achieved.

Each of the pixel transistors Tr1 to Tr4 is so configured that the ON current performance thereof corresponds to the weight of the corresponding binary bit of the digital image data. Specifically, in the present embodiment, the channel widths of the pixel transistors Tr1 to Tr4 are made to correspond to the sizes of the subpixel electrodes, i.e., made to have a channel width ratio of 1:2:4:8. By this configuration, appropriate writing to the pixels is ensured. It is noted that, in place of varying the channel widths of the pixel transistors Tr1 to Tr4, the channel lengths may be set to have sizes corresponding to the weights of the corresponding bits of digital image data. In addition, both the channel widths and the channel lengths may be varied to obtain ON current performance corresponding to the weights of the corresponding bits of digital image data.

In the present embodiment 1, the scan driver circuit 11 is a built-in driver circuit formed of polycrystalline silicon which is simultaneously formed with the liquid crystal display unit 10 in the production process thereof. By contrast, the data driver circuit 12 is formed of single crystal silicon and is such that IC chips formed of single crystal silicon are mounted onto the active matrix substrate by, for example, a chip-on-glass (COG) technique. The method of mounting the IC chips is not limited to COG, but may be TAB or the like. The use of single crystal silicon for the data driver circuit 12 makes it possible to remarkably reduce the device power consumption. The reasons are detailed below.

In recent years, there has been an increasing need for a narrow-framed liquid crystal display panel, in which the occupied area of peripheral driver circuits in the liquid crystal display panel is reduced. In view of this need, it has been proposed that the peripheral driver circuits be formed of polycrystalline silicon and be formed as built-in driver circuits. However, when all the driver circuits are formed of polycrystalline silicon, the power consumption significantly increases since the mobility in the transistors formed of polycrystalline silicon is far slower than that in the transistors of single crystal silicon. However, when all the driver circuits are formed of single crystal silicon, a narrow-framed panel cannot be achieved. In consideration of this problem, to compromise the needs for the narrow framed device and for a power consumption reduction, it is possible that either one of the scan driver circuit or the data driver circuit is formed of single crystal silicon. In the present embodiment, the data driver circuit 12 is formed of single crystal silicon because, having latch circuits and the like other than shift registers, the data driver circuit 12 has a more complicated circuit structure than that of the scan driver circuit 11 and therefore consumes greater power than the scan driver circuit 11 does. Therefore, the power consumed by the data driver circuit 12 occupies a significant proportion in the power consumed in the liquid crystal display panel as a whole. For this reason, it is desirable that from the viewpoint of effectively reducing power consumption, the data driver 12 be formed of single crystal silicon. Accordingly, in the present Embodiment 1, the data driver circuit 12 is formed of single crystal silicon to reduce power consumption while the scan driver circuit 11 is formed of polycrystalline silicon to meet the need for a narrow framed device.

Figure 3:
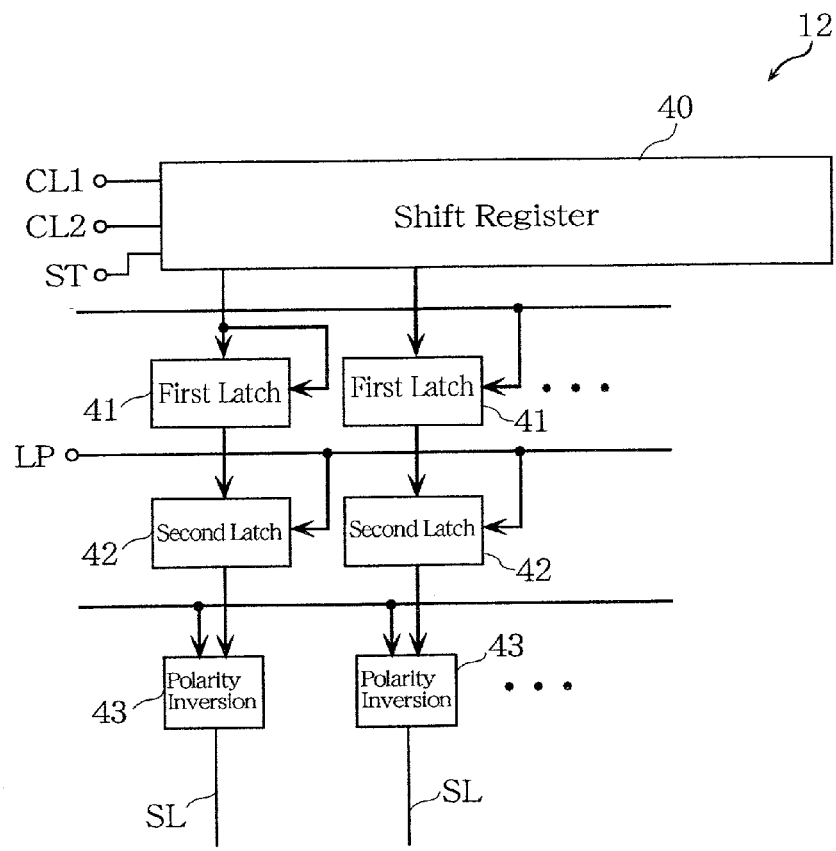
FIG. 3 is a block diagram showing a specific configuration of a data driver circuit 12.

FIG. 3 shows a block diagram illustrating a specific configuration of the data driver circuit 12. The data driver circuit 12 comprises a shift register 40, first latch circuits 41, second latch circuits 42, and polarity inverting circuits 43. The first latch circuit 41 latches a digital image signal, and the second latch circuit 42 latches the output from the first latch circuit. The polarity inverting circuit 43 is realized by, for example, EX-OR.

Figure 5:
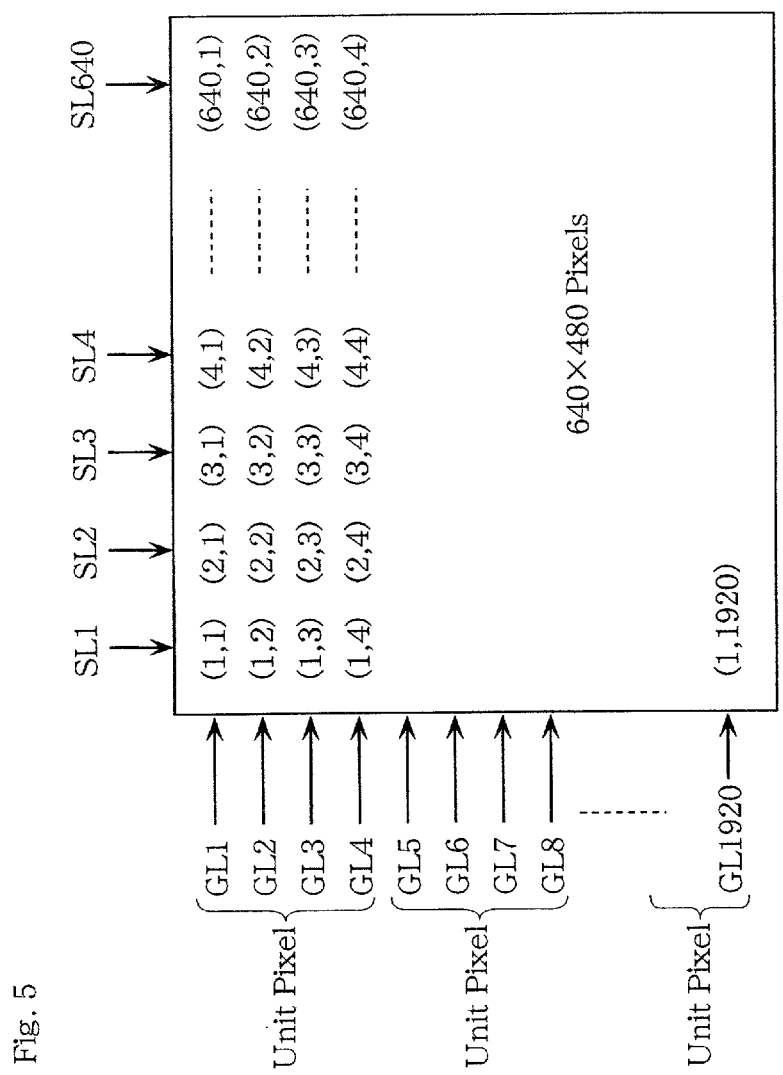
FIG. 5 schematically shows the arrangement of subpixels.
Figure 6A:
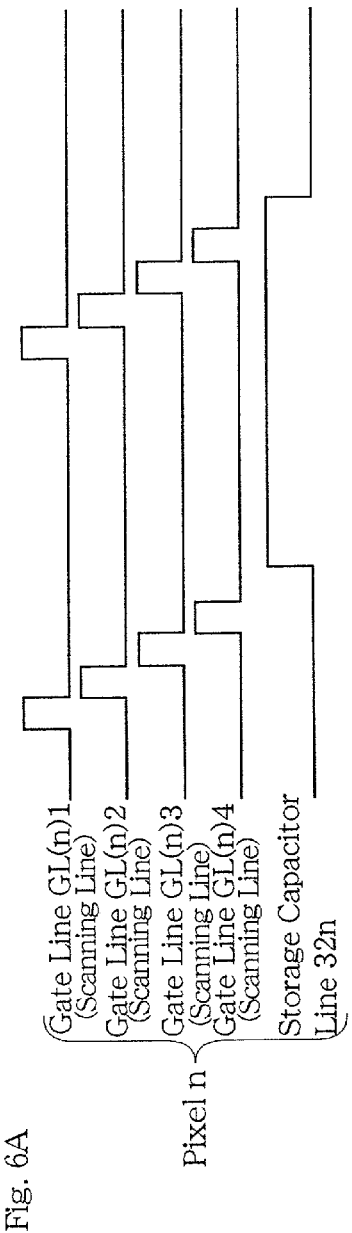
FIGS. 6A and 6B are timing charts showing variations of pixel electrode potentials.
Figure 6B:
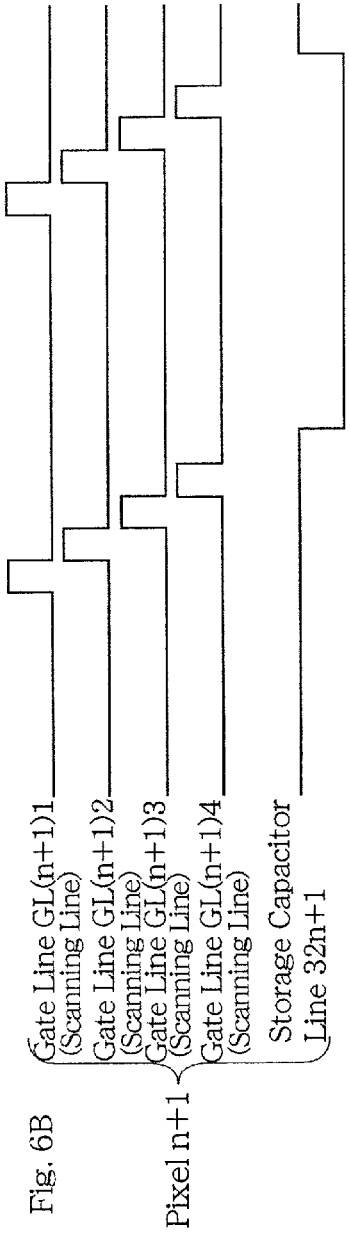

FIGS. 4(1) and 4(2) show data strings of the digital image data. FIG. 5 schematically shows the arrangement of subpixels. FIGS. 6A and 6B show timing charts of pixel electrode potential variation. In FIG. 5, (i, j) denotes a subpixel relating to the i-th source line SLi and the j-th gate line GLi. Shown as an example is a VGA (640×480 pixels) liquid crystal panel construction. Needless to say, each actual subpixel has such a size that the area of the subpixel corresponds to the weight of the corresponding binary bit of the digital data, and it is understood that FIG. 5, which shows the arrangement as if all the subpixels have the same size, is illustrative only and not meant to show the actual subpixel arrangement. The schematic view of FIG. 5, in which the subpixels are identified by the source lines SL and the gate lines GL, is used for the purpose of illustrating the display operation. Note also that FIG. 6A shows the timing relating to the n-th pixel, and FIG. 6B shows the timing relating to the n+1-th pixel.

First, image data is converted by a data converting circuit (not shown) from original image data shown in FIG. 4(1) to an image data string shown in FIG. 4(2). The image data shown in FIG. 4(2) is supplied to the input data line of the first latch circuit 41. In FIG. 4(2), bit data d(i, j) denotes the data for the subpixel relating to the i-th source line SLi and the j-th gate line GLj. As seen from FIGS. 4(1) and 4(2), a single pixel is represented by 4-bit data, and the 4-bit data are distributed to a set of four consecutive line data. For example, taking the pixel [1, 1] comprising the subpixels (1, 1), (1, 2), (1, 3), and (1, 4) as an example, the bit data d(1, 1) relating to the subpixel (1, 1) is distributed to the first line data string, the bit data d(1, 2) relating to the subpixel (1, 2) is distributed to the second line data string, the bit data d(1, 3) relating to the subpixel (1, 3) is distributed to the third line data string, the bit data d(1, 4) relating to the subpixel (1, 4) is distributed to the fourth line data string. These bit data d(1, 1) to d(1, 4) form the first bit data in the first to the fourth line data strings, respectively. For the rest of the unit pixels, such a distribution of 4-bit image data for a unit pixel is also performed.

First, when image data shown in FIG. 4(2) is supplied to an input data line, synchronizing with this, latch pulses are sequentially outputted from the shift register 40. Following this, the bit data in the first line data are sequentially latched by the first latch circuits 41. After the first line data have been latched by the first latch circuits 41, latch pulses are commonly supplied to all the second latch circuits 42. Thereby, the line data from the first latch circuits 41 are latched by the second latch circuits 42 and outputted via the source lines SL to the liquid crystal display unit 10. Synchronizing with this, the first gate line GL1 is selected. Thereby, the first line data is written to each of the subpixel electrodes connected to the first gate line GL1. Subsequently, in a similar manner, the second line data, the third line data, and the fourth line data are written. After the fourth line data have been written, (that is, after the unit pixels belonging to the first row have been written), the compensation voltage is shifted to the high potential side, as shown in FIG. 6A. Thereby, the pixel electrode potential of the unit pixels belonging to the first row is modulated to predetermined potentials. As a result, the potentials of the unit pixels in the first row have a positive polarity relative to the opposing electrode potential Vcom.

Let us now look at the operation for the pixel [1, 1]. By the writing of the first line data to the first subpixel row, bit data d(1, 1) is written to the subpixel (1, 1). In a similar manner, by the writings of the second to the fourth line data to the respective second to the fourth subpixel rows, bit data d(1, 2) is written to the subpixel (1, 2), bit data d(1, 3) is written to the subpixel (1, 3), and bit data d(1, 4) is written to the subpixel (1, 4). Subsequently, the compensation voltage is shifted to the high potential side, and the subpixel electrode potentials are modulated to the potentials which correspond to the bit data d(1, 1)-the bit data d(1, 4). Thus, the pixel [1, 1] is displayed at a predetermined gray level.

For example, in the case where bit data d(1, 1)="1", bit data d(1, 2)="0", bit data d(1, 3)="0", and bit data d(1, 4)="0", only the subpixel (1, 1) is turned ON while the subpixel (1, 2), the subpixel (1, 3), and the subpixel (1, 4) are turned OFF. Accordingly, the pixel [1, 1] is displayed at a brightness of level 1 of the 16 gray scale levels. For another example, in the case where bit data d(1, 1)="1", bit data d(1, 2)="1", bit data d(1, 3)="0", and bit data d(1, 4)="0", the subpixel (1, 1) and the subpixel (1, 2) are turned ON while the subpixel (1, 3) and the subpixel (1, 4) are turned OFF. Accordingly, the pixel [1, 1] is displayed at a brightness of level 3 of the 16 gray scale levels.

Note that the above examples describe only the operations for the pixel [1, 1], but similar display operations are carried out for the rest of the pixels to obtain display images with predetermined gray scale levels. Thus, gray scale display according to a video signal is carried out.

Subsequently, the writings of the fifth to the eighth line data to the fifth to the eighth subpixel rows are carried out, i.e., the writing to the unit pixels belonging to the second unit pixel row is carried out. The writing operations for the fifth to the eighth line data are basically similar to those for the first to fourth line data as described above. After the writings of the fifth to the eighth line data have been completed (that is, the writing to the unit pixels belonging to the second unit pixel row has been completed), the compensation voltage applied via the voltage controlling capacitor line 32 is shifted to the low voltage side, as shown in FIG. 6B. Thereby, the pixel electrode potentials of the unit pixels belonging to the second unit pixel row are modulated to predetermined potentials. As a result, the potentials of the unit pixels in the second row have a negative polarity relative to the opposing electrode potential Vcom.

Following this, similar operations to the above are carried out, and 4H inversion driving, in which the polarity is reversed every four subpixel rows, is performed (with regard to the rows of the unit pixels, the polarities are reversed every other row of the unit pixels).

Therefore, the occurrence of flicker is prevented. Of course, as will be described in Embodiment 3 below, a storage capacitor line may be provided for each subpixel to carry out the polarity inversion for every other line (every other subpixel row). However, when a capacitively coupled driving method is to be employed, this configuration results in a degradation in y characteristic linearity because a capacitively coupled driving method accompanies the pixel electrode potential modulation induced by capacitance coupling. In view of this, when the polarity inversion is carried out every four lines (every other unit pixel row), as is the case of the present embodiment, y characteristic linearity is improved and an improvement in image quality is achieved.

It is to be noted that although the description of the present embodiment has discussed examples of 4-bit (16 gray levels) displays, the present invention is not limited thereto. The unit pixel may be constituted by 5, 6, or more subpixels to perform, correspondingly, 5 bits (32 gray levels), 6 bits (64 gray levels), or multi-gray scale display with more gray levels.

It is also to be noted that although the present embodiment has described a black-and-white liquid crystal display device, the present invention is of course applicable to a full-color liquid crystal display device having subpixels of red, green, and blue (RGB) colors. When the invention is applied to a full-color liquid crystal display device, three unit pixels 15, 15, 15 are respectively assigned to RGB subpixels so that the three unit pixels 15, 15, 15 constitute a single pixel. In such a configuration of a full-color liquid crystal display device, the number of wiring line connections is not as many as the second prior art example. Therefore, this configuration solves the problems of the second prior art, which include connection defects and image quality degradation such as display defects, caused by a considerable increase in the number of connecting pins.

This advantage is further discussed below, taking a so-called VGA (640×480×RGB pixels) liquid crystal display panel as an example. When the second prior art example is compared to a conventional full color liquid crystal display device which does not employ a spatial dithering technique, the number of connecting pins in the device of the second prior art example is larger by 640×RGB×3=5,760 than the conventional full color liquid crystal display device, since the device of the second prior art example has such a wiring configuration that a source line is wired to each of the subpixels and a gate line is commonly wired to all the subpixels in a unit pixel. By contrast, the device of the present invention has such a wiring configuration that gate lines are wired to the respective subpixels and a source line is commonly wired to all the subpixels in a unit pixel, and therefore, the number of connecting pins are larger by only 480×3=1,440 than the conventional full color liquid crystal display device. Accordingly, the present invention suppresses the increased number of connecting pins in comparison with the second prior art example. Consequently, the present invention solves the problems of the second prior art example, which include connection defects and image quality degradation such as display defects, caused by an increase in the number of connecting pins.

Embodiment 2

Embodiment 2 is characterized in that, in a liquid crystal display device according to the foregoing Embodiment 1, the capacitance values of the voltage controlling capacitors are optimized, and the voltage amplitude of the scanning signal is minimized within the range in which the liquid crystal can be driven, in order to achieve a further reduction in power consumption. The details are given below.

(1) Optimization of Voltage Controlling Capacitance

In a liquid crystal display device according to Embodiment 2, the voltage controlling capacitance Cc is determined by the following Equation (1):

$$Cc = \{(V\text{bias}/V\text{epp} - V\text{bias})\} \cdot (Clc + Cgd) \quad (1)$$

In Equation (1) above, Vepp denotes the amplitude of the compensation voltage, Vbias denotes the amount of variation of the pixel voltage caused by the variation of the compensation voltage, and Clc denotes the liquid crystal capacitance in each subpixel, and Cgd denotes the parasitic capacitance of the transistor.

Figure 7:
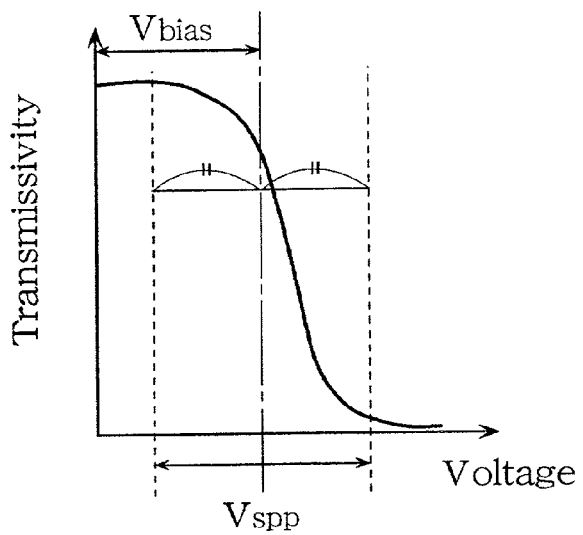
FIG. 7 is a graph showing the range of Vbias.

The introduction of the above equation (1) is now discussed below. When driving a liquid crystal, in consideration of the minimum liquid crystal driving voltage amplitude Vspp, Vbias is in the range shown in FIG. 7. Note that in a capacitively coupled driving method as employed in the present invention, by applying a compensation voltage Vepp from one of the electrodes of the voltage controlling capacitor, the amplitude required for a source line becomes the same amplitude as the liquid crystal driving voltage amplitude (Vspp). Therefore, Vbias is determined by the equation: Vbias={Cc/(Clc+Cgd)}·Vepp. By rearranging this equation, the foregoing Equation (1) is obtained. Accordingly, if the voltage controlling capacitance is set to be the value Cc in Equation (1), the liquid crystal is optimally driven. Taking margins for error in the actual fabrication into consideration, sufficient advantageous effects are obtained when the storage capacitance is set to be a value in the range of from 0.6 times to 1.4 times that of the value Cc.

Figure 8:
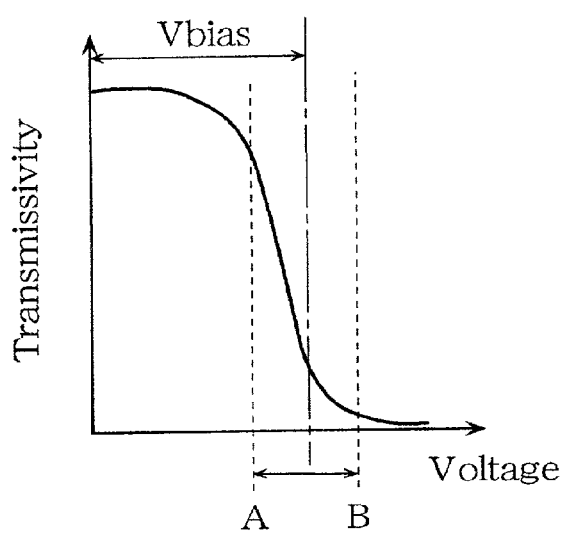
FIG. 8 is a graph showing the Vbias being shifted to the right.

If the voltage controlling capacitance is set to be an arbitrary value, the following problem arises. If Cc is an arbitrary value, Vbias shifts from one side to the other. As a consequence, for example, if Vbias shifts to the right, the voltage oscillates between A and B as shown in FIG. 8, and consequently white is not displayed. Conversely, if Vbias shifts to the left, black does not sufficiently become dark. Thus, optimum contrast is not obtained. Needless to say, FIG. 8 shows a case of a normally white mode, and in a case of a normally black mode, the shifts of Vbias cause the opposite phenomenon to that described above. This problem may be solved by increasing the amplitude, but increasing the amplitude also increases the power consumption. In view of these problems, when the value of the voltage controlling capacitance is set to satisfy the foregoing Equation (1), sufficient contrast is obtained at minimum power consumption and at minimum amplitude.

Furthermore, optimizing the voltage controlling capacitance as described above yields the advantageous effects as discussed below. When Cc is too small, leak current increases. Conversely, when Cc is too large, the aperture ratio decreases because of the increase of the electrode area for the voltage controlling capacitance. Thus, when the capacitance is set to be a value in the range of from 0.6 times to 1.4 times that of the optimum value, a liquid crystal display device is achieved in which leak current is suppressed and a high aperture ratio is attained.

(2) Optimization of Scanning Signal Voltage Amplitude Vgpp

In the liquid crystal display device according to Embodiment 2, the scanning signal voltage amplitude Vgpp is determined by the following Equation (2):

$$Vgpp = V\text{on} + Vth + Vspp/2 + V\text{offset} + Vlc + V\text{off} \quad (2)$$

In Equation (2), Von denotes the ON margin, Voff denotes the OFF margin, Vth denotes the threshold value of the TFT, Vspp denotes the minimum amplitude of the liquid crystal driving voltage, Voffset denotes the offset voltage (the difference between image signal's midpoint and voltage of the opposing electrode), and Vlc denotes the ON voltage of the liquid crystal. Taking margins for error in the manufacturing process into consideration, the voltage amplitude of the scanning signal is set to be 0.6 to 1.4 times that of Vgpp obtained by Equation (2). Accordingly, the voltage amplitude of the scanning signal is minimized within the voltage range in which sufficient display operation is possible, and therefore, a reduction in power consumption is achieved.

Figure 9:
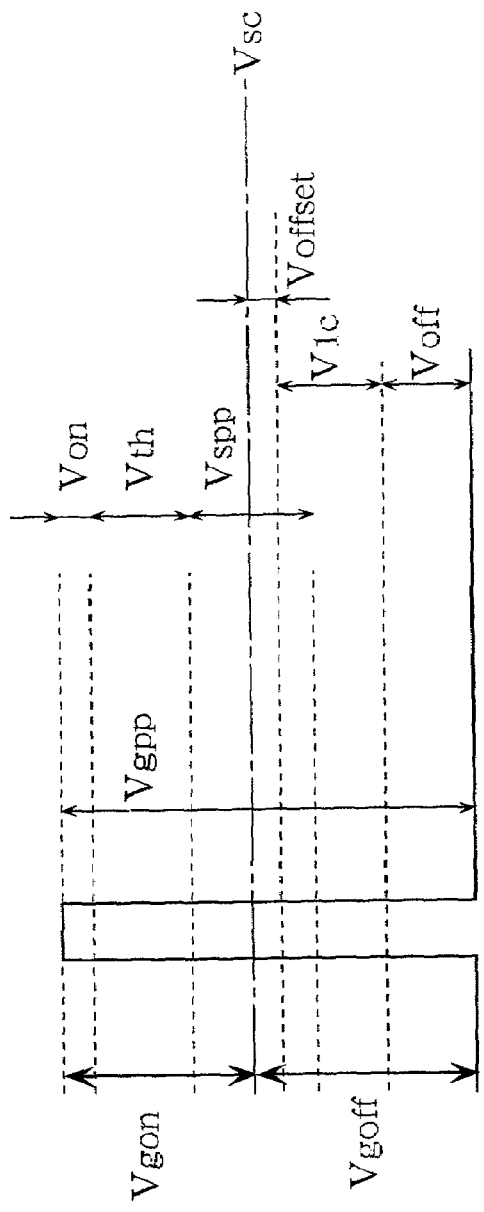
FIG. 9 shows the range of voltage amplitude Vgpp of a scanning signal.

Now referring to FIG. 9, the introduction of Equation (2) is discussed. In FIG. 9, Vsc denotes the signal's midpoint.

First, a gate amplitude required for driving liquid crystal is obtained. Where the portion in which the potential is higher than the image signal's midpoint value Vsc is defined as Vgon and the portion in which the potential is lower than the image signal's midpoint value Vsc is defined as Vgoff, the following Equation (3) holds:

$$Vgpp = Vgon + Vgoff \quad (3)$$

In the above Equation (3), Vgon satisfies the following Equation (4) and Vgoff satisfies the following Equation (5).

$$Vgon = Vspp/2 + Vth + V\text{on} \quad (4)$$

$$Vgoff = V\text{offset} + Vlc + V\text{off} \quad (5)$$

From Equations (3), (4), and (5), Equation (2) is derived. In the case where the voltage amplitude of the scanning signal is set to be a value less than the value Vgpp obtained by the above Equation (2), the voltage amplitude is less than the threshold voltage Vth and cannot turn the state of liquid crystal ON. On the other hand, in the case where the voltage amplitude is set to be a value greater than Vgpp, it is not desirable from the viewpoint of power consumption, although it is possible to turn the liquid crystal ON. Therefore, it is understood that in the present invention, which employs a capacitively coupled driving method, when the voltage amplitude is set to a value obtained by the above Equation (2), the liquid crystal is driven at a minimum voltage amplitude.

Hence, the present invention achieves a reduction in power consumption since the liquid crystal is driven at a minimum scanning signal amplitude Vgpp.

Thus, according to the present Embodiment 2, in a liquid crystal display device employing a driving method in which spatial dithering and capacitively coupled driving are combined, voltage controlling capacitance is optimized and, at the same time, compensation voltage amplitude Vepp and gate signal amplitude Vgpp are optimized. Thereby, it is made possible to drive a liquid crystal at a minimum voltage amplitude while the picture image quality of the liquid crystal display device is maintained, and a remarkable reduction in the power consumption is achieved.

Supplementary Remarks for Embodiments 1 and 2

The liquid crystal display devices according to the above Embodiments 1 and 2 may be suitably applied to both transmissive and reflective type liquid crystal display devices. In particular, in cases of reflective type liquid crystal display devices, it is possible to provide large subpixel regions by disposing source lines SL, gate lines GL, pixel transistors Tr1 to Tr4, and voltage controlling capacitors C under the reflective pixel electrodes.

(2) In the above-described embodiments, the scan driver circuit 11 is formed of polycrystalline silicon and the data driver circuit 12 is formed of single crystal silicon, but the present invention is not limited thereto. Both the scan driver circuit 11 and the data driver circuit 12 may be formed of polycrystalline silicon.

(3) The liquid crystal display devices according to the present invention may be suitably applied to display devices for information terminal devices such as mobile telephones.

The above supplementary remarks may also be applicable to the other embodiments herein.

Embodiment 3

Figure 10:
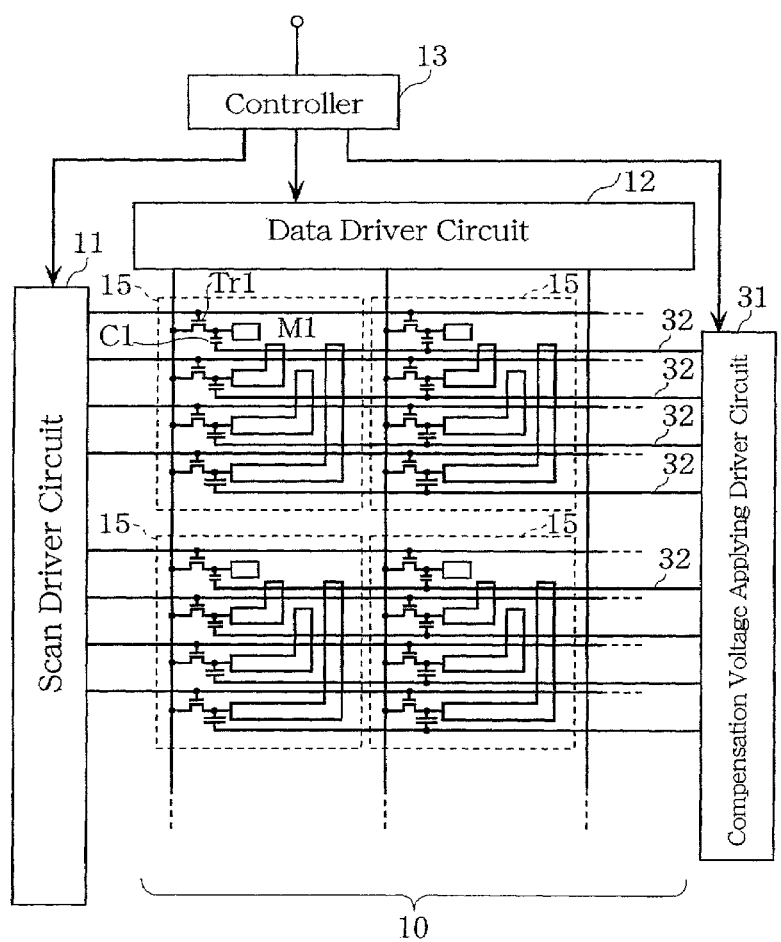
FIG. 10 is a circuit diagram of a liquid crystal display device made in accordance with Embodiment 3.
Figure 11:
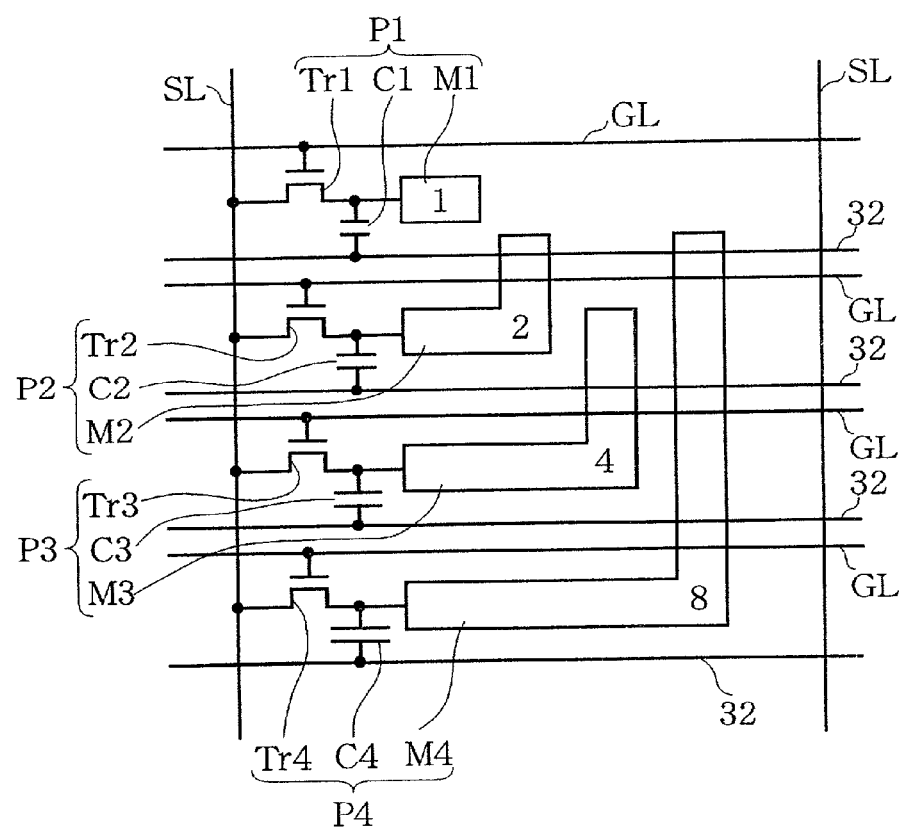
FIG. 11 is a circuit diagram showing the configuration of a unit pixel in the liquid crystal display device of Embodiment 3.

FIG. 10 shows a circuit diagram of a liquid crystal display device according to Embodiment 3, and FIG. 11 shows a circuit diagram illustrating the configuration of a unit pixel therein. Embodiment 3 is similar to the foregoing Embodiment 1, and like parts are designated by like reference numerals. In the foregoing Embodiment 1, the voltage controlling capacitor lines 32 are wired to the respective unit pixels (precisely speaking, the voltage controlling capacitor lines 32 are individually wired to the respective unit pixels with respect to a vertical column, and each of the voltage controlling capacitor lines 32 is commonly wired to a plurality of unit pixels in a horizontal row). By contrast, in the present Embodiment 3, the voltage controlling capacitor lines 32 are individually wired to the respective subpixels (precisely speaking, the voltage controlling capacitor lines 32 are individually wired to the respective subpixels with respect to a plurality of unit pixels with respect to a vertical column, and each of the voltage controlling capacitor line 32 is commonly wired to a plurality of unit pixels in a horizontal row). The device of the present Embodiment 3 has such a difference in the wiring configuration of the voltage controlling capacitor lines, and accordingly, the subpixel electrode potentials are varied by varying the potentials of the voltage controlling capacitor lines 32 after the writing to the respective subpixels has been completed. Consequently, in the present Embodiment 3, it is possible to perform 1H inversion driving, and in comparison with the foregoing Embodiment 1, flicker is more effectively prevented.

The shapes of the subpixel electrodes are not particularly limited and may be a rectangular shape or an L-shaped angular shape.

Embodiment 4

Figure 12:
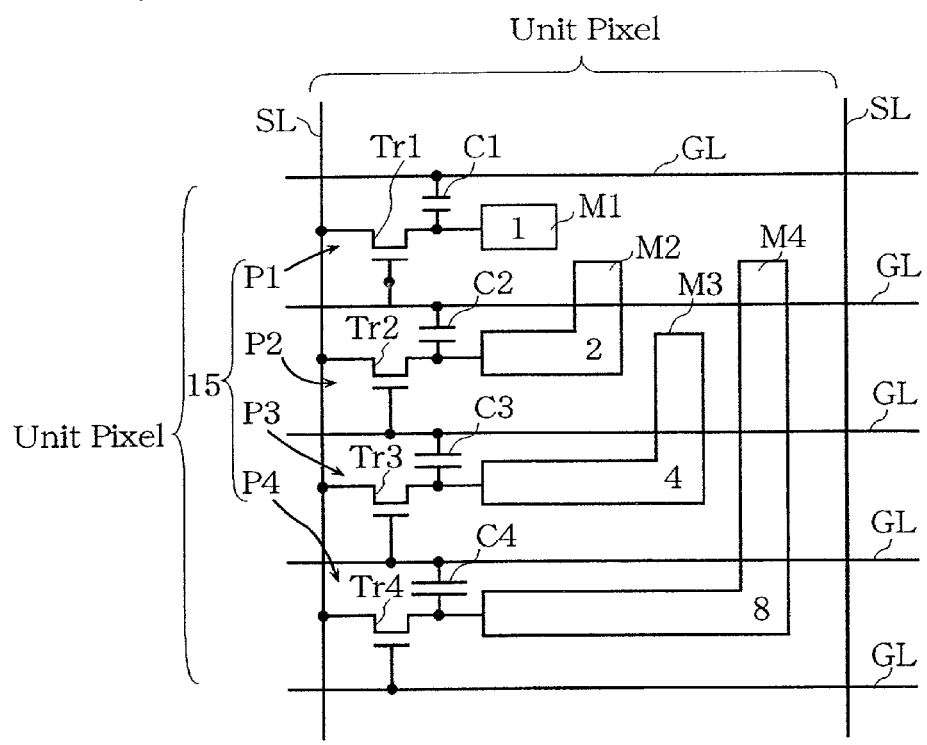
FIG. 12 shows the configuration of a unit pixel in the liquid crystal display device of Embodiment 4.

FIG. 12 shows a configuration of a unit pixel in a liquid crystal display device according to Embodiment 4. Embodiment 4 differs from the foregoing Embodiment 3 in that the voltage controlling capacitor lines 32 are eliminated, and one of the electrodes of each voltage controlling capacitor C1 to C4 is respectively connected to the gate line GL immediately upstream thereof. Thus, in the device of Embodiment 4, the scan driver circuit has the function of applying a compensation voltage, so that after the writing of the subpixels in a given row has completed, the potential of the upstream gate line GL is varied to modulate the subpixel electrode potential to a predetermined potential.

This configuration eliminates the voltage controlling wiring lines 32 and therefore achieves a simplification and a cost reduction in the wiring configuration. It is noted that although FIG. 12 shows that the pixel transistors Tr1 to Tr4 are connected to the respective upstream gate lines GL of the upstream gate line GL and the downstream gate line GL, the following configuration is also possible; each of the transistors is connected to the upstream gate line GL and one of the electrodes of each voltage controlling capacitor is connected to the downstream gate line.

Embodiment 5

Figure 13:
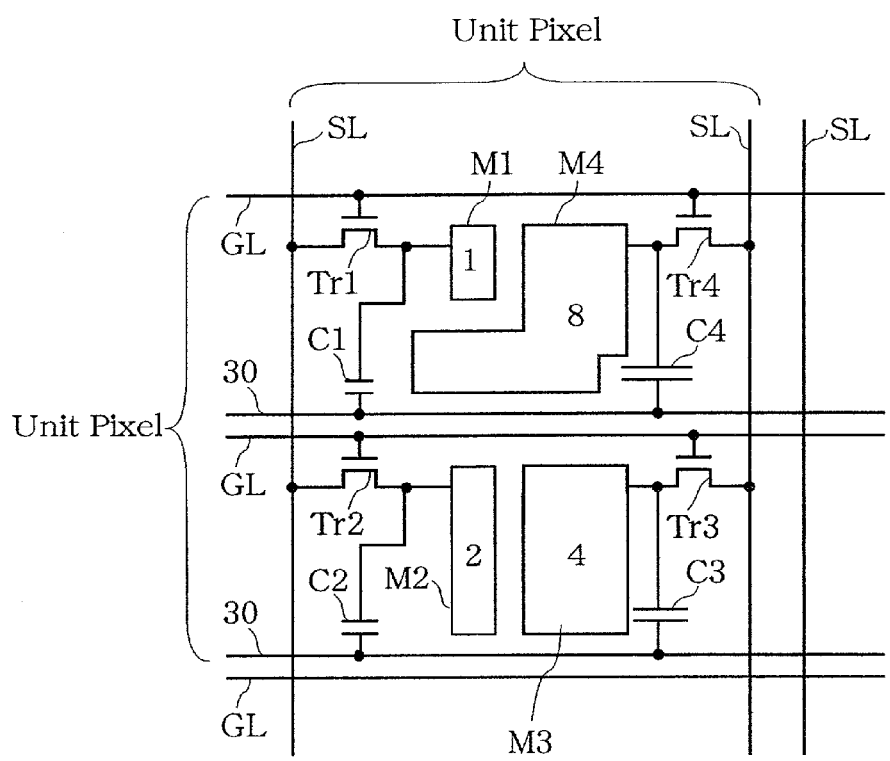
FIG. 13 shows the configuration of a unit pixel in the liquid crystal display device of Embodiment 5.

FIG. 13 shows a configuration of a unit pixel in a liquid crystal display device according to Embodiment 5. The device of Embodiment 5 has such a configuration that each unit pixel has two source lines SL in addition to two gate lines GL and two voltage controlling capacitor lines 30. By employing this configuration, although the number of the required source lines SL is twice that required in the foregoing Embodiment 3, for example, the number of the required source lines is still ½ of the prior art. Therefore, in comparison with the prior art, the pitch between the connection pins is increased, and therefore the connecting process of the source lines is easily carried out and the cost of the semiconductor is reduced.

Embodiment 6

A liquid crystal display device of Embodiment 6 carries out gray scale display by combining together a similar spatial dithering method to those of the foregoing embodiments and a Pulse Width Modulation driving method (see, for example, Japanese Unexamined Patent Publication No. 5-107561), in which a single frame is divided into a plurality subframes including a writing period and a hold period to perform gray scale display by the cumulative effects of the hold periods. The combination of the spatial dithering method and a PWM driving method is desirable for the following reasons. In cases of using 6-bit data for displaying 64 gray levels, for example, if display is carried out entirely using a spatial dithering method, the electrode area ratio is such that the smallest area is 1 and the largest one is 32, and such an electrode layout is very difficult to produce. For this reason, in the display method according to Embodiment 6, a spatial dithering method is used for 4 bits out of the 6 bits (16 gray levels) and a PWM driving method is used for the remaining 2 bits (4 gray levels). Thus, by combining a spatial dithering method and a PWM driving method, it is possible to make the pixel electrode layouting easy and perform a multi-gray scale display of 64 gray levels or more.

Embodiment 7

For another embodiment of a driving method for gray scale display, an error diffusion method (such as disclosed in Japanese Unexamined Patent Publication No. 8-286634) may be combined with a spatial dithering method to perform display operation. This driving method eliminates, by the error diffusion method, the problems of the occurrence of flicker and the occurrence of persistent patterns inherent to spatial dithering, thereby improving image quality.

A specific example that uses an error diffusion method is illustrated below.

FIGS. 14A to 14D schematically illustrate the concept of an error diffusion method employed in a liquid crystal display device in accordance with Embodiment 7. The description of the present embodiment discusses a case in which 16 gray level display is performed.

An error diffusion method achieves a multi-gray scale levels by adding to or subtracting from the data of adjacent pixels the differences (errors) between a value that the display panel can display and a value that are to be displayed. The device of the present embodiment is configured so that in the data driver circuit 12 as described in the foregoing Embodiment 1, an error diffusion processing unit is provided such that error diffusion operation can be performed.

Here, let us assume a case of image input data having 256 gray levels.

Figure 14:
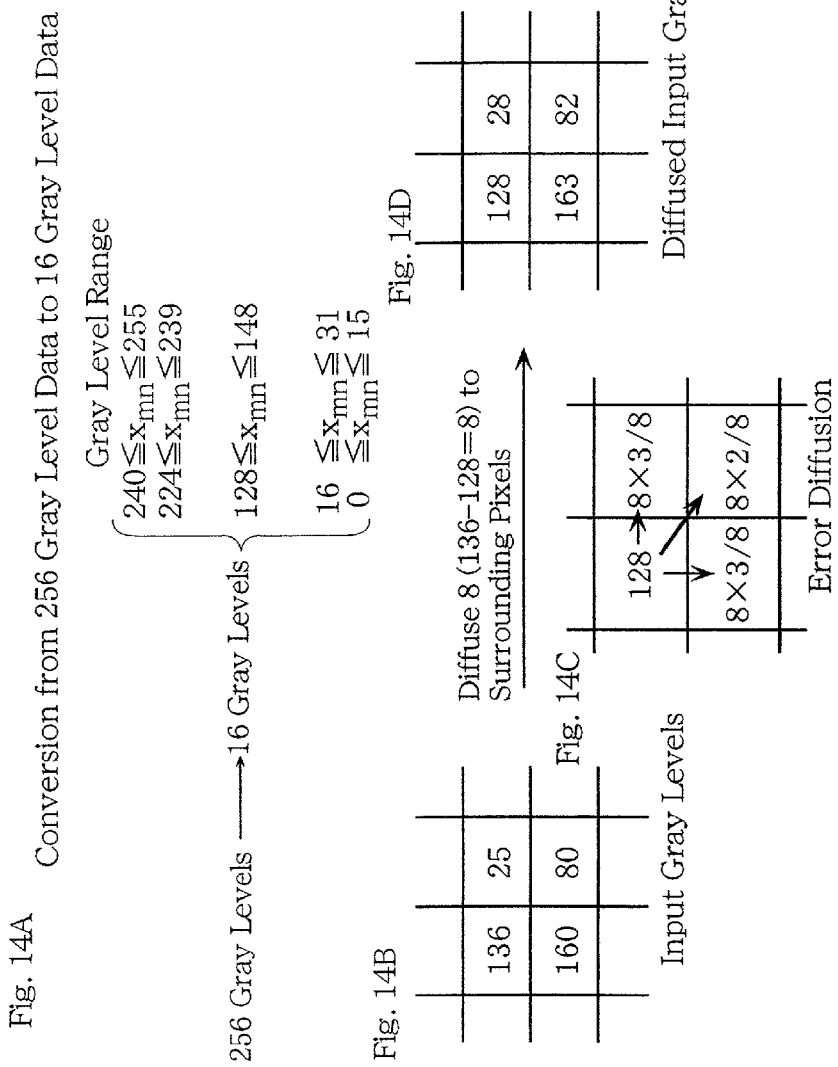
FIGS. 14A to 14D illustrate the concept of an error diffusion method employed in a liquid crystal display device in accordance with Embodiment 7.

First, 256 gray level image input data must be converted to 16 gray level display data. This converting process is performed with the use of an error diffusion processing. The gray level ranges in the case where 256 gray level data are converted to 16 gray level data are determined as follows. The gray level data in the range of level "0" to level "15" in 256 gray scale are converted to level "0" in 16 gray scale. The gray level data in the range of level "16" to level "32" in 256 gray scale are converted to level "1" in 16 gray scale. In like manners, the ranges of conversion levels as shown in FIG. 14A are determined.

Then, prior to the conversion from 256 gray level image input data to 16 gray level display data, an error diffusion processing is performed. As shown in FIG. 14B, taking a set of four square-shaped pixels E1 to E4 as an example, an example of the error diffusion processing is specifically described. First, the error diffusion processing is performed for pixel E1. Specifically, the level of the image input data for pixel E1 is converted to the minimum value in the conversion range that contains the level of the input data. Thereafter, the difference between the level of the original image input data and the level of the converted data is obtained, and the difference is distributed, as an error, to the adjacent pixels E2, E3, and E4 to provide the processed input data. A case where the 256 gray level image input data for the four pixels E1 to E4 have level "136", level "25", level "160", and level "80", respectively, is discussed as an example in the following. As shown in FIG. 14B, the difference 8 is obtained between level "136" and level "128", level "128" being the minimum value in the conversion level range that contains level "136"; next, as shown in FIG. 14D, in the pixel E2, 8×(3/8) is added to the original level "25" to obtain level "28"; in the pixel E3, 8×(3/8) is added to the original level "160" to obtain level "163"; and in the pixel E4, 8×(2/8) is added to the original level "80" to obtain level "82". This processing is performed for the whole display unit. Thus, the processed image input data obtained by the error diffusion processing are converted into 16 gray level display data, and based on the converted 16 gray level display data, display operation is performed. In this manner, the image input data are subjected to an error diffusion processing prior to the conversion to 16 gray level data, and thereby gray scale display free from image quality degradation is achieved.

Suppplementary Remarks for Embodiment 7

(1) The liquid crystal display devices according to the present invention may be suitably applied to both transmissive and reflective type liquid crystal display devices. In particular, in cases of reflective-type liquid crystal display devices, it is possible to provide large subpixel regions by disposing source lines SL, gate lines GL, pixel transistors Tr1 to Tr4, and voltage controlling capacitors C1 to C4 under the reflective pixel electrodes.

(2) In the present embodiment, the scan driver circuit 11 is formed of polycrystalline silicon and the data driver circuit 12 is formed of single crystal silicon, but the present invention is not limited thereto. Both the scan driver circuit 11 and the data driver circuit 12 may be formed of polycrystalline silicon.

The above supplementary remarks may also be applicable to the other embodiments herein.

Embodiment 8

Embodiment 8 is characterized in that in addition to the voltage controlling capacitor, a storage capacitor is formed in each subpixel. This configuration makes it possible to have a large load capacitance and to further improve pixel electrode potential-holding characteristic. Thus, image quality improvement is achieved.

Figure 15:
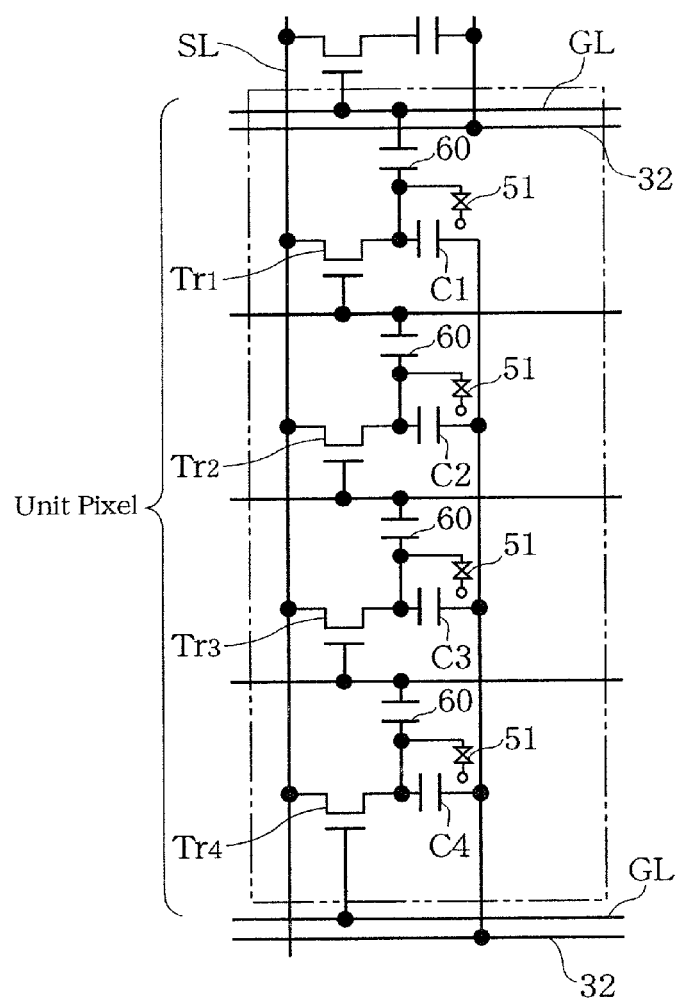
FIG. 15 shows the configuration of a unit pixel in a liquid crystal display device in accordance with Embodiment 8.
Figure 16:
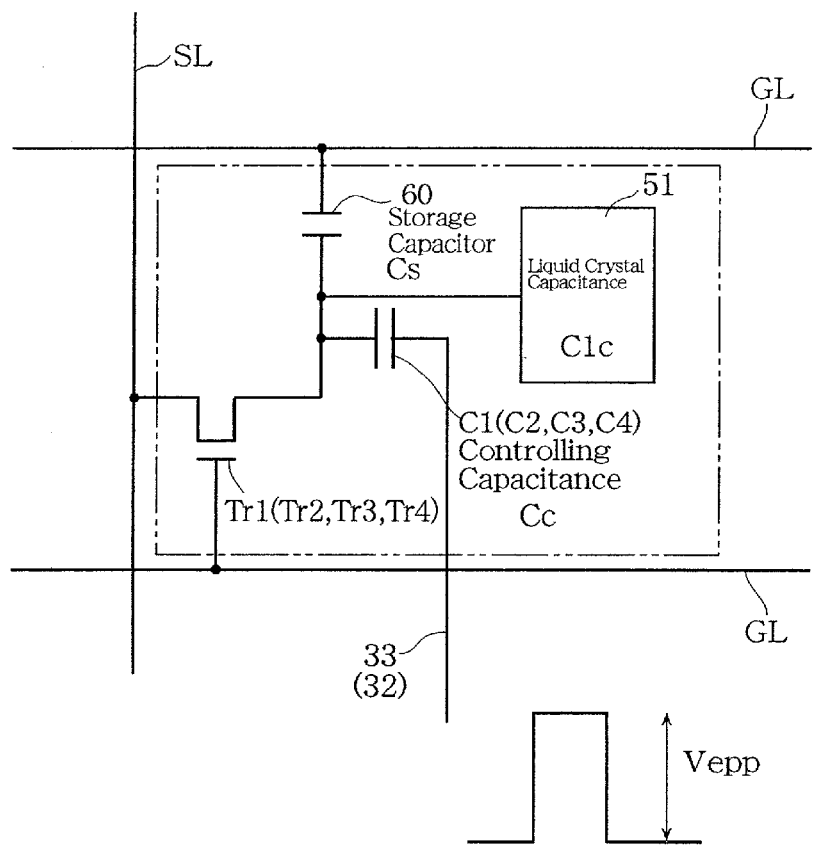
FIG. 16 is a circuit diagram showing the equivalent circuit of a subpixel in the liquid crystal display device of Embodiment 8.

Referring now to FIGS. 15 and 16, the present embodiment is detailed below.

FIG. 15 shows the configuration of a unit pixel in a liquid crystal display device according to Embodiment 8, and FIG. 16 shows the equivalent circuit of a subpixel thereof. Similar parts to the foregoing Embodiment 1 are designated by like reference numerals and will not be further elaborated upon. A subpixel P1 in the liquid crystal display device according to the present embodiment has, in addition to the voltage controlling capacitor C1, a storage capacitor 60 formed between the subpixel electrode and the immediately upstream gate line GL. The other subpixels P2 to P4 also have a similar configuration to that of the subpixel P1. In the following discussion, the capacitance value of the storage capacitor 60 is represented as Cs, the capacitance value of the liquid crystal capacitance 51 as Clc, and each of the capacitance value of the voltage controlling capacitors C1 to C4 as Cc.

Figure 17:
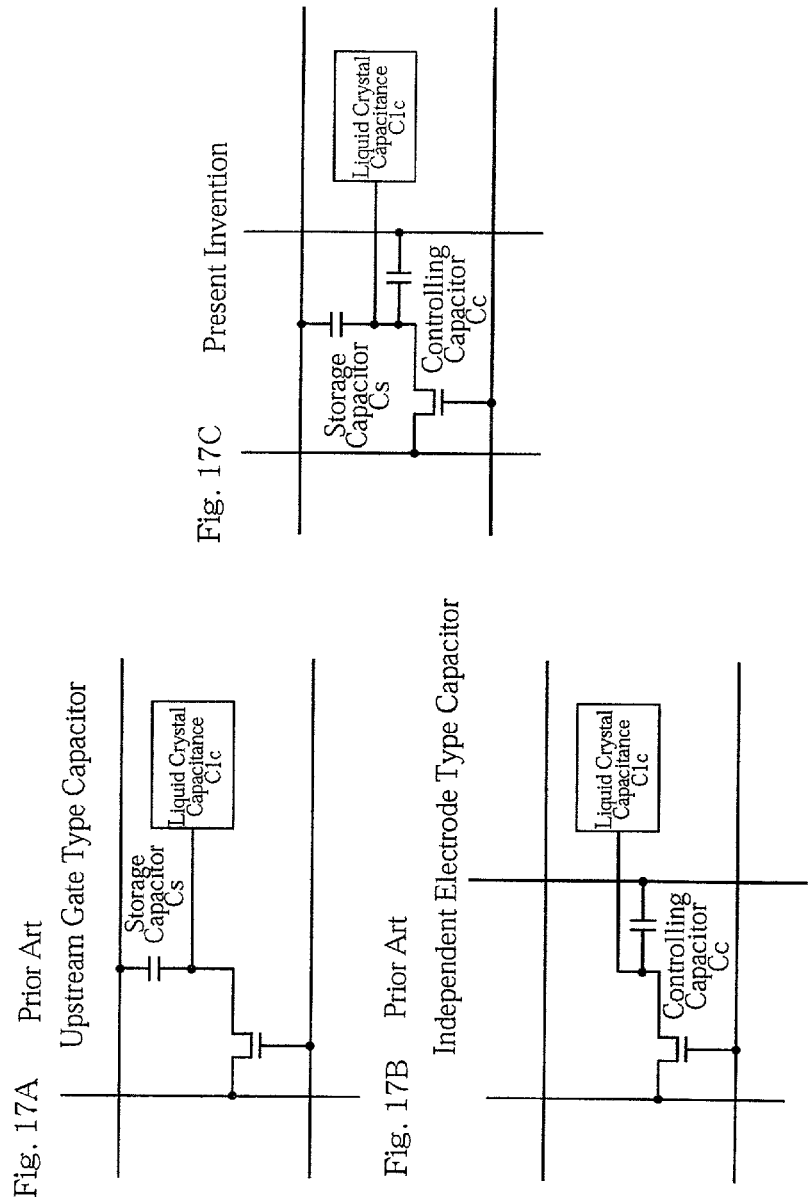
FIGS. 17A, 17B, and 17C show the configurations of capacitors in the present invention and prior art examples.

In conventional configurations for auxiliary capacitances, an auxiliary capacitor has been provided either between the upstream gate line and the liquid crystal capacitance (see FIG. 17A) or on the voltage controlling capacitor line (see FIG. 17B). By contrast, the present embodiment employs a configuration in which auxiliary capacitors are provided both on the voltage controlling capacitor line and between the upstream gate line and the liquid crystal capacitance (see FIG. 17C). This configuration increases the capacitance value added to the liquid crystal capacitance, achieving a good holding characteristic.

In particular, in the liquid crystal display device according to the present embodiment, in which a unit pixel is divided into a plurality of subpixels, it is difficult to ensure a sufficient capacitance value by the voltage controlling capacitor only. Therefore, the configuration in which a storage capacitor is provided in addition to the voltage controlling capacitor ensures a necessary and sufficient capacitance value.

Next, optimum drive conditions for the present embodiment are obtained.

Table 1 below shows how the optimum drive conditions are obtained in the present embodiment.

TABLE 1

|  | Setting (Necessary condition) | Explanation |
|---|---|---|
| Compensation voltage: Vepp | 3.6 V | Integral multiple of reference voltage (= 1.8 V) |
| Bias voltage: Vb | 1.5 V | Optimum bias value determined by T-V characteristic of the liquid crystal |
| Storage capacitance: Cs | 0.13 pF | Gate electrode line width (= 6 μm) |
| LC load capacitance: Ctot (= Clc + Cs + Cc) | ≧0.25 pF | Ensures holding characteristic of liquid crystal cell |

First, desirable conditions for driving the liquid crystal panel are determined. In the present embodiment, the amplitude of the compensation signal supplied to the voltage controlling capacitor line is set at 3.6 V. This is because the controllers for liquid crystal panels are in most cases driven at a voltage of 1.8 V, and therefore, it is preferable that the voltages of other signals are set to be integral multiples of 1.8 V, in order to obtain greater efficiency in the power supply design. That is, when Vepp is an integral multiple of the reference voltage which is externally provided, such as a voltage for controlling the controller, it is possible to use a high efficiency DC-DC converter typified by a charge pump for the power supply circuit. As a consequence, the power consumption of the system as a whole is reduced.

Figure 18:
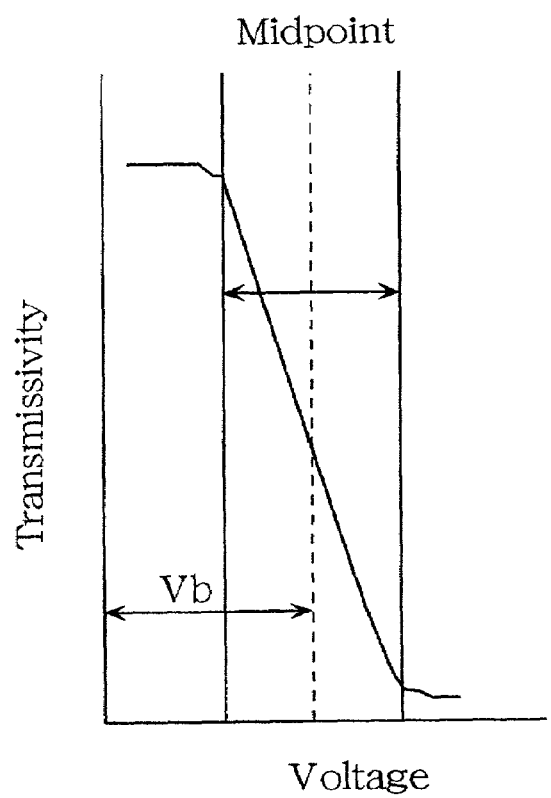
FIG. 18 shows a driving waveform in a driving method of a liquid crystal display device in accordance with Embodiment 8.

Next, the value of bias voltage to be applied to the liquid crystal is determined from the compensation voltage Vepp. The bias voltage is determined by the voltage -transmissivity characteristic of the liquid crystal, and when the value is set at exactly the midpoint of the transmissivity change as shown in FIG. 18, the amplitude of the required data signal voltage becomes minimum. The bias voltage is set at 1.5 V in the present embodiment.

Next, the value of the storage capacitance to be formed between the upstream gate line and the liquid crystal capacitance is determined. This is determined by the signal line width of the scanning electrode. In the present embodiment, the width of the scanning electrode is designed to be 6 μm, and accordingly the value of the storage capacitance is designed to be 0.13 pF.

Next, the controlling capacitance Cc is determined by the following Equation (6):

$$Cc=\{(Vbias/Vepp-Vbias)\}\cdot(Clc+Cs) \quad (6)$$

In Equation (6), Vbias denotes the amount of variation of the pixel voltage caused by variation of the compensation voltage, Vepp denotes the voltage amplitude of the compensation voltage signal, Clc denotes the liquid crystal capacitance, and Cs denotes the storage capacitance.

The controlling capacitance Cc is obtained by substituting into Equation (6) the above values and the liquid crystal capacitance Clc that is determined by the size of the pixel electrode. Eventually, the total sum of Clc, Cs, and Cc is designed such that it becomes a capacitance that can obtain satisfactory holding characteristic of the liquid crystal. In the present embodiment, the off resistance of the TFT is taken into consideration and the total sum is designed to be 0.25 pF or greater.

The combinations of the capacitances that satisfy the above-described condition are shown in the following Table 2.

TABLE 2

| Subpixel | LC capacitance (Clc) | Storage capacitance (Cs) | Voltage controlling capacitance (Cc) | Load capacitance (Ctot) |
|---|---|---|---|---|
| M1 | 0.024 | 0.13 | 0.11 | 0.26 |
| M2 | 0.048 | 0.13 | 0.13 | 0.31 |
| M3 | 0.096 | 0.13 | 0.16 | 0.39 |
| M4 | 0.192 | 0.13 | 0.23 | 0.55 |

A liquid crystal display device according to the present embodiment is fabricated such that liquid crystal capacitance Clc, storage capacitance Cs, voltage controlling capacitance Cc, and the total sum of the capacitances Ctot are one of the combinations shown in Table 2 above. This makes it possible to drive all the subpixels at the same bias voltage and to ensure necessary and sufficient holding characteristic in all the subpixels.

It is preferable that polycrystalline silicon thin film transistors be employed for functional elements in the scan driver circuit and the data driver circuit in the active matrix substrate and for switching elements in the image display unit. This achieves a reduction in the sizes of the transistors in the subpixels, and the device designing is made easy. In addition, incorporating the driver circuits into the active matrix substrate becomes easy, and this contributes to cost reduction and device size reduction.

It is to be noted that while the above example of the device is constructed such that each unit pixel is divided into a plurality of subpixels and each of the subpixels satisfies the conditions shown in Table 2 above, the method of optimizing the voltage controlling capacitance is not so limited but may be applied to conventional unit pixel configurations, which do not have subpixel configurations.

The configuration described above is suitable for a reflective-type panel because the storage capacitors and the controlling capacitors can be designed without taking aperture ratio into consideration. These additional variations may be independently provided or may be combined together.

Embodiment 9

Embodiment 9 is characterized in that the subpixel electrodes are configured such that the centroids of the areas of all the subpixel electrodes match each other. This configuration makes it possible to reduce persistent patterns caused in spatial dithering display as much as possible.

Figure 40:
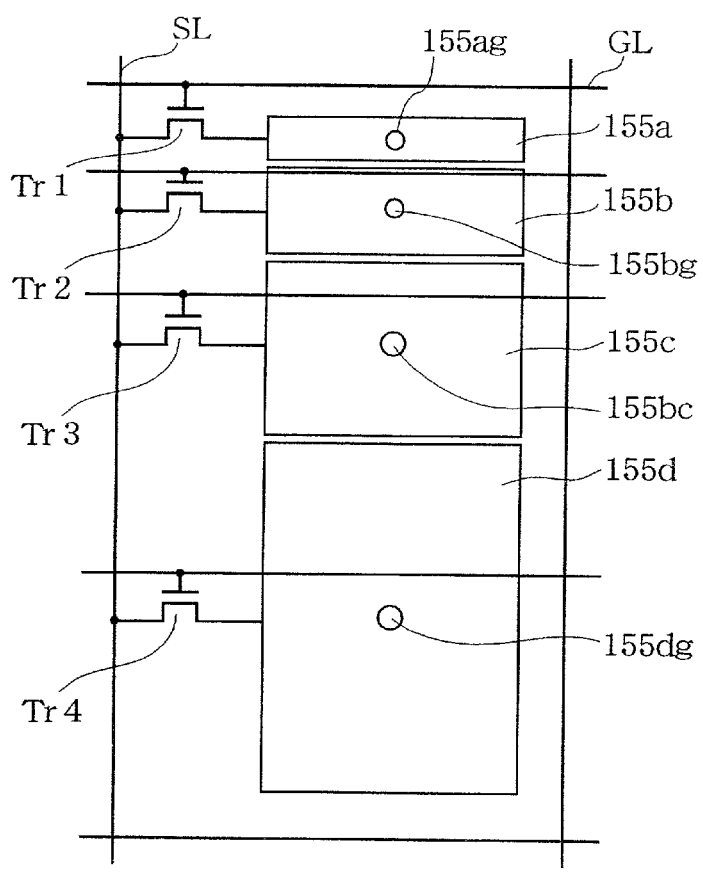
FIG. 40 is a circuit diagram showing the configuration of a pixel in a prior-art active matrix liquid crystal display panel that performs display operation using digital image data by spatial dithering.

The present inventors have made extensive research to solve the problem of persistent pattern occurrence in the prior art. As a result, we have found that the cause of the persistent pattern is as follows: as shown in FIG. 40, the centroids of the areas of the pixel electrodes 155*a*, 155*b*, 155*c*, and 155*d* are dispersed, so that when a certain gray level is desired, the gray levels are distributed in an unbalanced way. (Specifically, as shown in (a) in FIG. 21, which will be later discussed, the pixels displaying gray level 7 and gray level 8 appear on the screen as if they are at irregular positions, thus causing the persistent patterns on the screen as mentioned above.)

In view of this problem, the present inventors have found that when the centroids of the subpixel electrodes in a unit pixel are brought close to each other, the occurrence of persistent patterns in the display screen is prevented. Thus, the present inventors have accomplished an image display device that suppresses image quality degradation.

A specific example of the configuration is discussed below.

Figure 19:
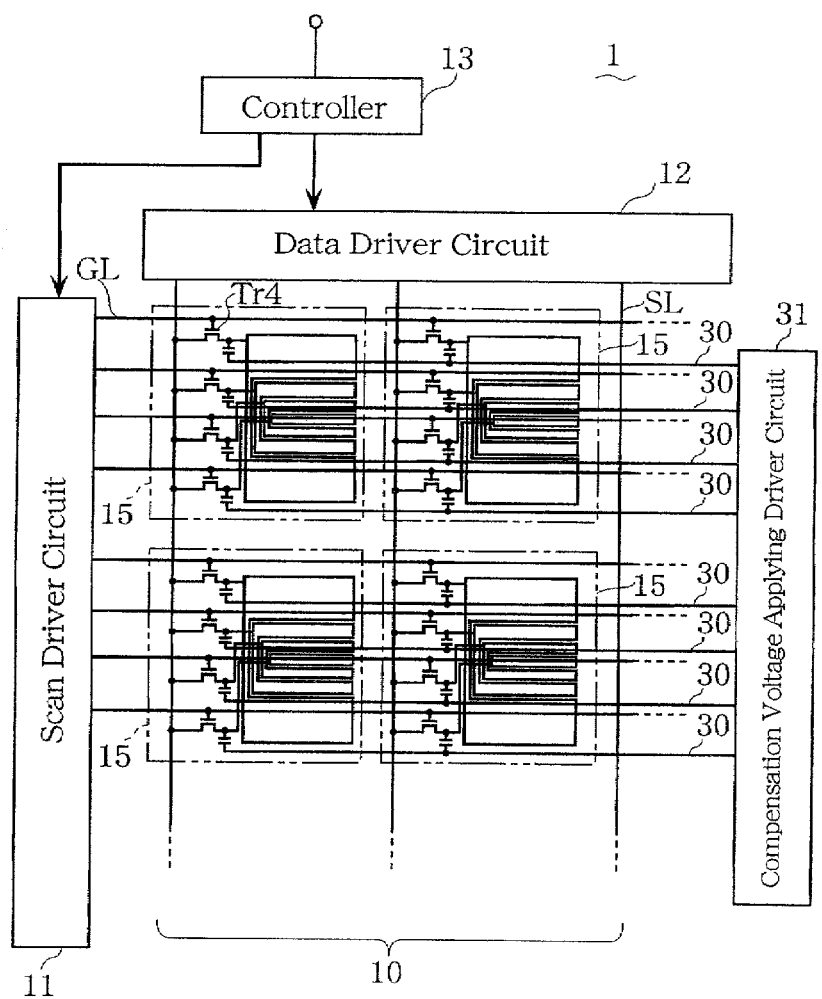
FIG. 19 is a circuit diagram showing the configuration of a liquid crystal display device in accordance with Embodiment 9.
Figure 20:
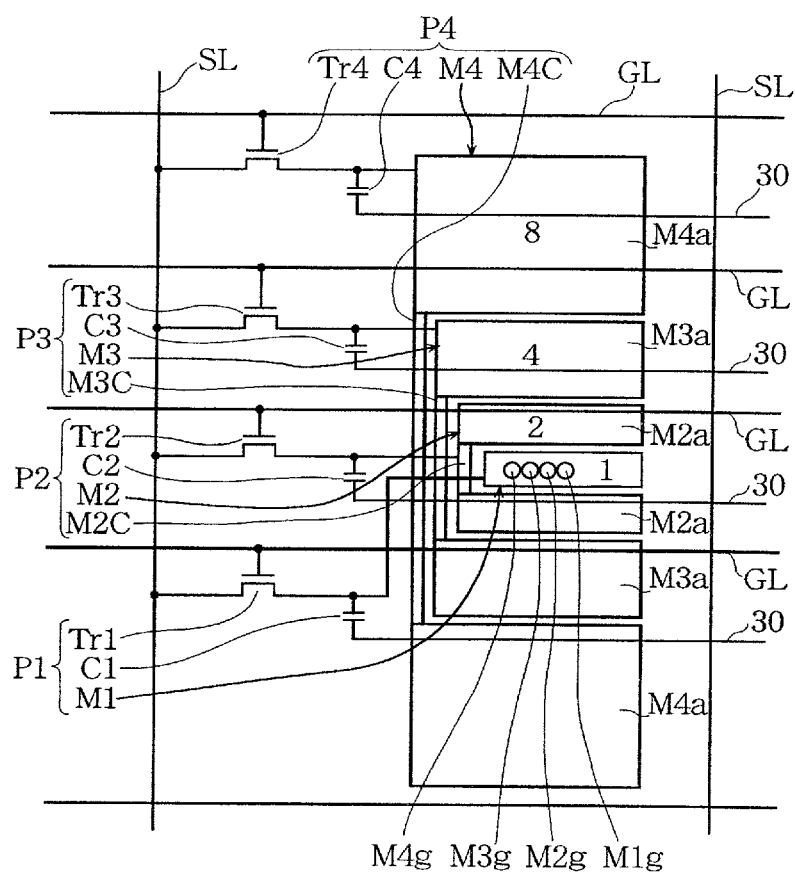
FIG. 20 is a circuit configuration diagram showing the configuration of a unit pixel in the liquid crystal display device of Embodiment 9.

FIG. 19 shows a circuit diagram of a liquid crystal display device according to Embodiment 9 of the present invention, and FIG. 20 shows a circuit diagram of the configuration of a unit pixel therein. This Embodiment 9 is similar to the foregoing Embodiment 1, and therefore, like parts are designated by like reference numerals and will not be further elaborated upon. This liquid crystal display device is of a digital driving system type by which gray scale display is performed using a digital image signal. The digital image signal has 4-bit data format. The device is of an active matrix type and is capable of displaying 16 gray levels.

The features of the present Embodiment 9 are the shapes and the arrangements of subpixel electrodes M1 to M4. Referring now to FIGS. 19 and 20, a specific example of the configurations is discussed below. A subpixel electrode M1 has the smallest area among the subpixel electrodes M1 to M4, and is disposed substantially at the center of the unit pixel 15 (with respect to a longitudinal side of the pixel).

Around the subpixel electrode M1, a subpixel electrode M2 having a substantially angular C-shape is disposed.

Specifically, the subpixel electrode M2 comprises subpixel electrode portions M2a, M2a having substantially the same electrode area, a connecting electrode M2c for electrically connecting the two subpixel electrode portions M2a, M2a. The subpixel electrode portions M2a, M2a are disposed above and below (as viewed in the drawing) the subpixel electrode M1 so that they sandwich the subpixel electrode M1 (formed in two substantially rectangular shaped portions arranged substantially parallel to each other), and the connecting electrode M2c is disposed along the left side (as viewed in the drawing) of the subpixel electrode M1.

Around the subpixel electrode M2, a subpixel electrode M3 having a substantially angular C-shape is disposed. The subpixel electrode M3 comprises subpixel electrode portions M3a, M3a having substantially the same electrode area, and a connecting electrode M3c for electrically connecting the two subpixel electrode portions M3a, M3a. The subpixel electrode portions M3a, M3a are disposed above and below (as viewed in the drawing) the subpixel electrodes M2 so that they sandwich the subpixel electrode M2, and the connecting electrode M3c is disposed along the left side (as viewed in the drawing) of the connecting electrode M2c.

Around the subpixel electrode M3, a subpixel electrode M4 having a substantially angular C-shape is disposed. The subpixel electrode M4 comprises subpixel electrode portions M4a, M4a, and a connecting electrode M4c for electrically connecting the two subpixel electrode portions M4a, M4a. The subpixel electrode portions M4a, M4a are disposed above and below (as viewed in the drawing) the subpixel electrodes M3 so that they sandwich the subpixel electrode M3, and the connecting electrode M4c is disposed along the left side (as viewed in the drawing) of the connecting electrode M3c. The reference characters M1g, M2g, M3g, and M4g respectively represent the centroids of the subpixel electrodes M1 to M4.

Figure 21:
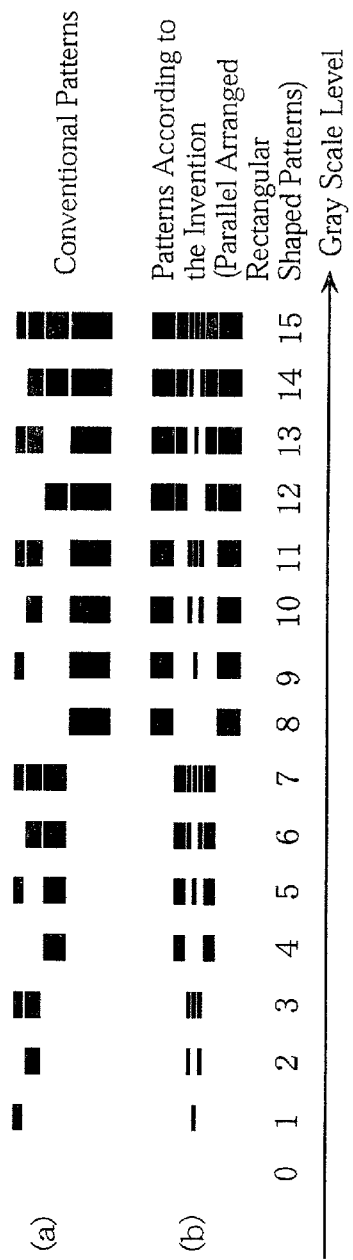
FIG. 21 illustrates the concept of spatial dithering in the liquid crystal display device of Embodiment 9.

FIG. 21 schematically illustrates the concept of the spatial dithering of the present embodiment. In conventional configurations having subpixels in a unit pixel as shown in (a) in FIG. 21, when a unit pixel displays gray level 7 and another unit pixel adjacent thereto displays gray level 8, the positions of the centroids greatly differ between the pixel displaying gray level 7 and the pixel displaying gray level 8. Consequently, persistent patterns appear on the display screen, preventing a smooth gray scale image rendering. However, in the configuration according to the present embodiment as shown in (b) in FIG. 21, even when a unit pixel displays gray level 7 and another unit pixel adjacent thereto displays gray level 8, the positions of the centroids in the pixel displaying gray level 7 and the pixel displaying gray level 8 are in close proximity to each other, and as a result, the balance of gray levels improves, thus preventing the occurrence of persistent patterns.

Thus, pixels are configured such that the positions of the centroids M1g, M2g, M3g, and M4g in the respective subpixel electrodes M1, M2, M3, and M4 (see FIG. 20) are in close proximity to each other, and consequently, the gray levels in the images displayed by the image display device become smooth, improving image quality.

In the present Embodiment 9, the subpixel arrangement is such that the subpixel electrode M2 is disposed around the subpixel electrode M1, the subpixel electrode M3 around the subpixel electrode M2, and the subpixel electrode M4 around the subpixel electrode M3. It is to be understood, however, that other subpixel electrode configurations may be employed; for example, at least one of the subpixel electrodes M2, M3, and M4 comprises a plurality of divided subpixel electrode portions and two of the plurality of divided subpixel electrode portions are arranged to sandwich at least one of the rest of the subpixel electrodes. This configuration also suppresses the occurrence of persistent patterns.

In addition, the subpixel electrodes may be disposed so that at least one of the subpixel electrodes M2, M3, and M4 surrounds at least one of the other subpixel electrodes (M1–M4). This configuration too suppresses the occurrence of persistent patterns. Such specific variations of the configuration are discussed in more detail in Embodiment 11 below.

While a capacitively coupled driving method is employed in the above-described example, this example is presented merely for illustrative purposes, and conventional driving methods may be employed. In cases of conventional driving methods, the compensation voltage applying driver circuit 31 and the voltage controlling capacitors C1 to C4 are unnecessary.

For reference purpose, it is noted that Japanese Unexamined Utility Model Publication No. 61-42591 discloses a liquid crystal display cell in which the display portions having their areas varied at a rate of $2^n$ are formed to shape substantially concentric circles. At a glance, it may appear that because the centroids of the display portions match each other in the liquid crystal display cell of Japanese Unexamined Utility Model Publication No. 61-42591, the display cell is similar to the present embodiment in which the centroids of the subpixel electrodes match each other. In this prior art example, however, the arrangement is applied only to the liquid crystal display cell, i.e., to the liquid crystal display cell construction in which only the electrodes are arranged, and therefore, the TFT array writing lines and the like are not provided. If the TFT array wiring lines as those of the present invention were to be formed in this prior art example, the wiring line layout would become too complex, requiring an ultra fine pattern processing, which is infeasible. Hence, this prior art example is completely different from the present invention in the subpixel configurations and has a completely different technical idea from that of the present invention.

Embodiment 10

Figure 22:
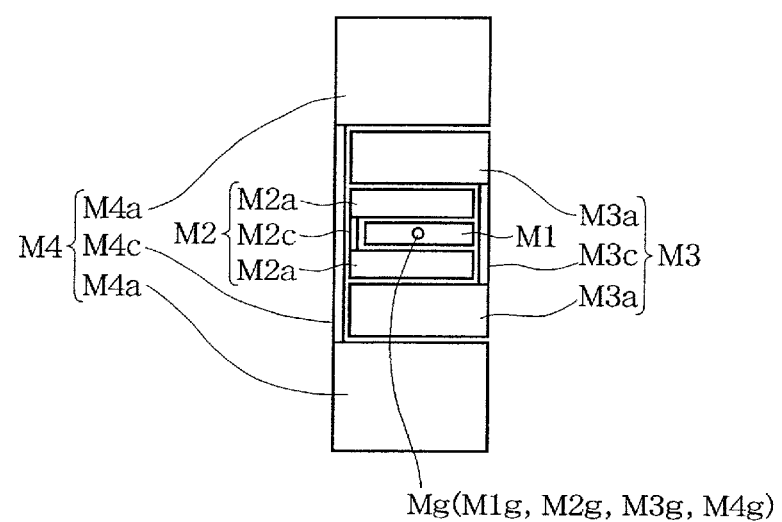
FIG. 22 is a schematic view showing the configuration of a unit pixel in a liquid crystal display device in accordance with Embodiment 10.

FIG. 22 is a schematic view illustrating a configuration of a unit pixel in a liquid crystal display device according to Embodiment 10. The configuration of the liquid crystal display device of Embodiment 10 differs from that of the foregoing Embodiment 9 in that the positions of the centroids of the subpixels electrodes are brought even closer such that they substantially match each other. This configuration further suppresses the occurrence of persistent patterns and makes the gray levels of display images even smoother. A specific example of the configuration is discussed below. The configuration of the portions other than that of the subpixel electrodes M1 to M4 is similar to the foregoing Embodiment 9, and therefore will not be further elaborated upon.

A subpixel electrode M1 is disposed substantially at the center of the unit pixel (not shown) and has the smallest area among the subpixel electrodes M1 to M4. A subpixel electrode M2 having a substantially angular C-shape is disposed so as to surround three sides of the subpixel electrode M1. The subpixel electrode M2 comprises subpixel electrode portions M2a, M2a having substantially the same electrode area, and a connecting electrode M2c for electrically connecting the subpixel electrode portions M2a and M2a. The subpixel electrode portions M2a, M2a are disposed above and below (as viewed in the drawing) the subpixel electrode M1 so that they are arranged so as to sandwich the subpixel electrode M1. The connecting electrode M2c is disposed along the left side (as viewed in the drawing) of the subpixel electrode M1.

Around the subpixel electrode M2, a subpixel electrode M3 having a substantially angular C-shape is disposed. The subpixel electrode M3 comprises subpixel electrode portions M3a, M3a having substantially the same electrode area, and a connecting electrode M3c for electrically connecting the subpixel electrode portions M3a, M3a, and the subpixel electrode portions M3a, M3a are disposed above and below (as viewed in the drawing) the subpixel electrode M2 so that they are arranged so as to sandwich the subpixel electrode M2. The connecting electrode M3c is disposed so that the connecting electrode M3c is opposed to the foregoing connecting electrode M2c with respect to centroid Mg (M1g, M2g, M3g, M4g).

Around the subpixel electrode M3, a subpixel electrode M4 having a substantially angular C-shape is disposed. The subpixel electrode M4 comprises subpixel electrode portions M4a, M4a having substantially the same area, and a connecting electrode M4c for electrically connecting the subpixel electrode portions M4a, M4a. The subpixel electrode portions M4a, M4a are disposed above and below (as viewed in the drawing) the subpixel electrode M3 so that they are arranged so as to sandwich the subpixel electrode M3. The connecting electrode M4c is disposed so that the connecting electrode M4c is opposed to the foregoing connecting electrode M3c with respect to the centroid Mg (on the same side of the connecting electrode M2c with respect to the centroid Mg).

The area ratio of the subpixel electrodes is such that the size of each subpixel electrode corresponds to the weight of each corresponding bit of the digital signal image data. That is, the area of the subpixel electrode M1: the area of the subpixel electrode M2: the area of the subpixel electrode M3: the area of the subpixel electrode M4=1:2:4:8, as is the ratio in the foregoing Embodiment 1.

In this configuration, the centroids M1g, M2g, M3g, M4g of the subpixel electrodes M1, M2, M3, and M4 substantially match each other (are located at Mg). As a result, the occurrence of persistent patterns is further suppressed in comparison with the foregoing Embodiment 1, and the gray levels of the images displayed by the liquid crystal display device become even smoother, thus improving image quality.

Embodiment 11

Figure 23:
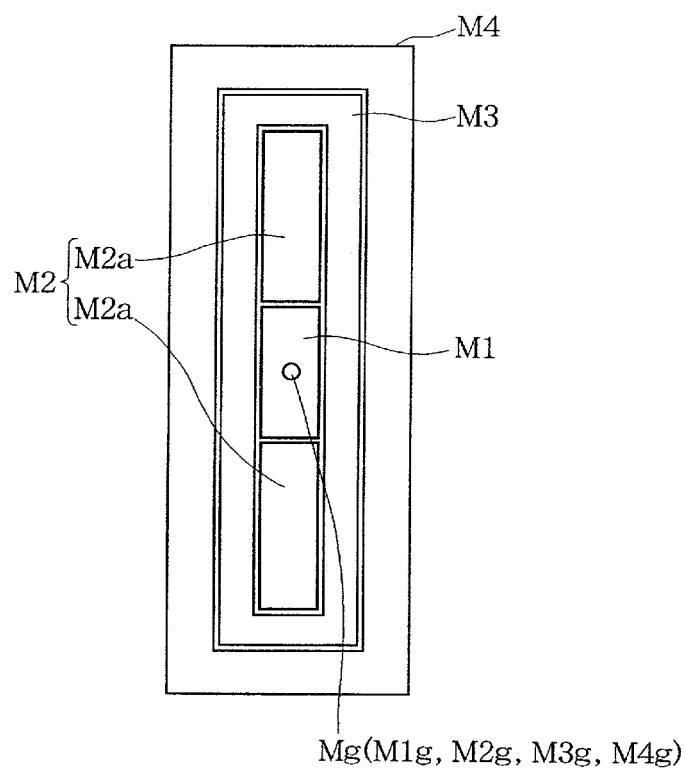
FIG. 23 is a schematic view showing the configuration of a unit pixel in the liquid crystal display device of Embodiment 11.

FIG. 23 schematically shows a configuration of a unit pixel in a liquid crystal display device according to Embodiment 11. The configurations of the portions other than the subpixels M1 to M4, for example, the configurations of the pixel transistors, the storage capacitors, and so forth, are similar to those in the foregoing Embodiment 9 and therefore will not be further elaborated upon.

The subpixel electrode M1 has the smallest area among the subpixel electrodes M1 to M4 and is disposed substantially at the center of the unit pixel. A subpixel electrode M2 comprises two rectangular shaped subpixel electrode portions M2a, M2a having substantially the same electrode area and being arranged substantially parallel to each other so as to sandwich the subpixel electrode M1. The subpixel electrode portions M2a, M2a are electrically connected to each other via a connecting electrode (not shown).

Around the subpixel electrodes M1 and M2, a subpixel electrode M3 having a substantially square frame shape is disposed, and further, around the subpixel electrode M3, a subpixel electrode M4 having a substantially square frame shape is disposed so that the subpixel electrode M4 surrounds the subpixel electrodes M1, M2, and M3. The subpixel electrodes are so formed to have an area ratio such that the subpixel electrode areas correspond to the weights of corresponding binary bits of digital image data. That is, the area of the subpixel electrode M1: the area of the subpixel electrode M2: the area of the subpixel electrode M3: the area of the subpixel electrode M4=1:2:4:8.

In this configuration, the centroids of the subpixel electrodes M1, M2, M3, and M4 substantially match each other (at Mg). As a result, the occurrence of persistent patterns is further suppressed, and the gray levels of the images displayed by the liquid crystal display device become even smoother, thus improving image quality.

In the present Embodiment 11, the shape of the subpixel electrode M2 is described to be such that substantially rectangular shaped portions are arranged substantially parallel to each other, but this is for illustrative purposes only. For example, the subpixel electrode M2 may have a substantially square frame shape, as the subpixel electrodes M3 and M4 and the subpixel electrode M1 may be disposed inside the subpixel electrode M2.

Embodiment 12

Figure 24:
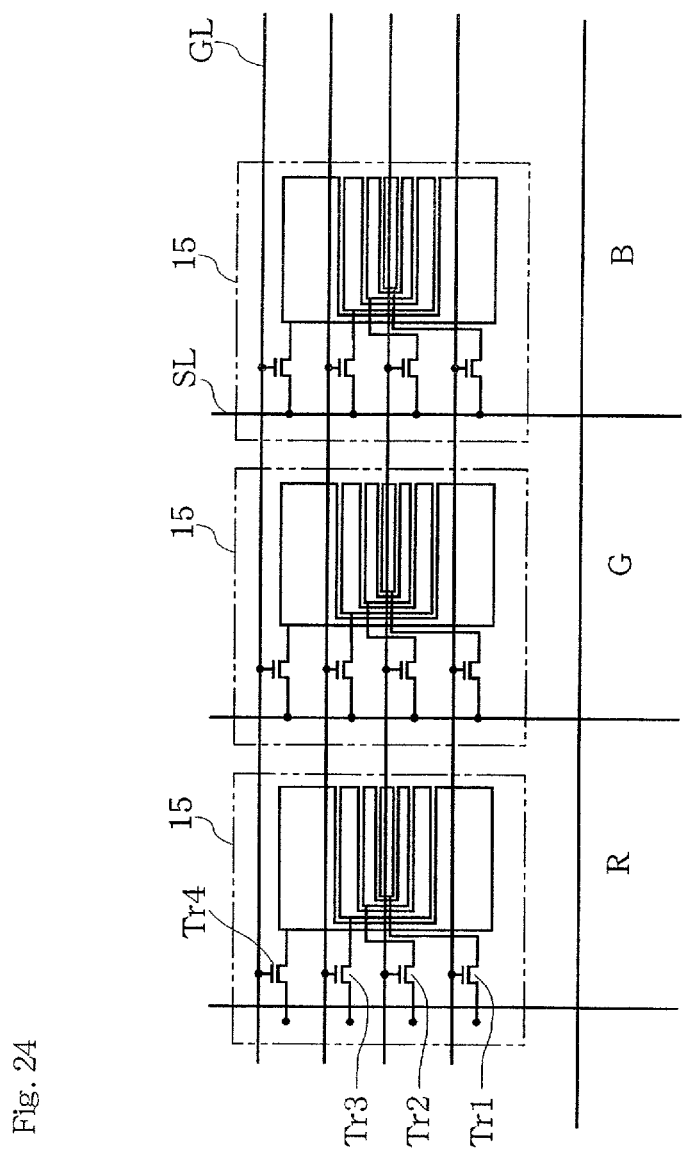
FIG. 24 is a circuit diagram showing a portion of a liquid crystal display device in accordance with Embodiment 12, where color image display is performed.

FIG. 24 shows a circuit diagram of a liquid crystal display device according to Embodiment 12, wherein color display is performed. In FIG. 24, the voltage controlling capacitors and the like as discussed in the foregoing Embodiment 9 are not shown for the sake of clarity.

In the foregoing Embodiments 9 to 11, black and white liquid crystal display devices have been discussed as examples. However, a liquid crystal display device capable of displaying full color is achieved when the unit pixels 15 are respectively assigned to each color of red (R), green (G), and blue (B), as discussed in the present Embodiment 12. In the present invention, a full color liquid crystal display device is achieved as follows: three unit pixels 15 are respectively assigned to R, G, B subpixels so that the three unit pixels 15 form a pixel, and thus the unit pixels arrayed in each horizontal row are respectively designated for R, G, B subpixels.

The full color liquid crystal display device with this configuration achieves the prevention of the occurrence of persistent patterns and a smooth gray level rendering in the images displayed by the image display device, thus improving image quality.

Embodiment 13

FIG. 25 schematically shows a pixel configuration in a liquid crystal display device according to Embodiment 13, wherein color display is performed. In the foregoing Embodiment 12, a color liquid crystal display device has been described. In the present Embodiment 13, the configuration is such that the areas of the pixel electrodes of the unit pixels for green (G) are larger than the areas of the pixel electrodes of the unit pixels for red (R) and blue (B). This configuration achieves improvement in viewing characteristics. It is known that, of R, G, B colors, G has the greatest influence on human vision. Therefore, when forming the regions for G to have a larger size than the sizes of the regions for R and B, viewing characteristics are improved, rather than when forming the regions for each R, G, B to have an equal size.

In addition, the number of the subpixels in the unit pixels corresponding to green (G) is made larger than that of the subpixels in the unit pixels corresponding to red (R) or blue (B). Specifically, the unit pixels corresponding to red (R) and blue (B) are driven by 4-bit digital data signal, whereas the unit pixels corresponding to green (G) are driven by 5-bit digital data signal.

This configuration improves display screen-viewing characteristics, thus achieving a full color image display device with smoother gray levels of the images and improved image quality.

Embodiment 14

Figure 26:
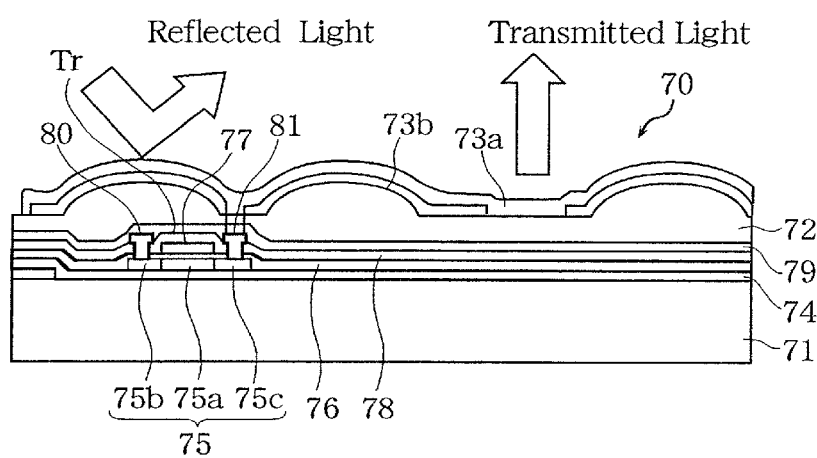
FIG. 26 is a schematic cross-sectional view showing a liquid crystal display device in accordance with Embodiment 14.

FIG. 26 shows a schematic cross sectional view of a liquid crystal display device according to Embodiment 14.

This liquid crystal display device is a transfiective type liquid crystal display device in which an opening window is provided in a reflective electrode, and in the opening window, a transmissive electrode is provided. The liquid crystal display device has a panel substrate 70, an opposing substrate (not shown) made of glass or the like, and a liquid crystal layer (now shown) sandwiched between the panel substrate 70 and the opposing substrate.

As shown in FIG. 26, the panel substrate 70 comprises a glass substrate 71, which is an insulating substrate, a plurality of thin film transistors Tr formed on the glass substrate 71 and arranged in a matrix configuration, a resin film 72 formed on the glass substrate 71 so as to cover the thin film transistors Tr, and a transparent pixel electrode 73a and a reflective electrode 73b formed on the resin film 72.

The thin film transistors Tr are top-gated thin film transistors each of which comprises a buffer layer 74, a polycrystalline silicon semiconductor layer 75, a gate insulating film 76, a gate electrode 77, an interlayer insulating film 78, and a protective film 79, all of which are stacked over a glass substrate 71 in this order.

The polycrystalline silicon semiconductor layer 75 comprises a channel region 75a, a source region 75b, and a drain region 75c. The source region 75b and the drain region 75c are disposed on opposing sides of the channel region 75a and are doped with impurity ions such as boron ions to be P-type semiconductor layers. The channel region 75a is disposed below the gate electrode 77.

The gate insulating film 76 and the interlayer insulating film 78 are provided with contact holes formed therein, and via the contact holes, the source electrode 80 and the drain electrode 81 are respectively connected to the source region 75b and the drain region 75c.

The liquid crystal display device according to Embodiment 14 adopts a spatial dithering display method, like the device of the foregoing Embodiment 9. The pixel electrode configuration is similar to that of the foregoing Embodiment 9, that is, the area ratio of the subpixel electrodes is such that the sizes of the subpixel electrodes correspond to the weights of corresponding bits of digital image data (the area of the subpixel electrode M1: the area of the subpixel electrode M2: the area of the subpixel electrode M3: the area of the subpixel electrode M4=1:2:4:8) so that 16 gray levels can be displayed. The shapes of the subpixel electrodes are also similar to those in the foregoing Embodiment 9. In the present embodiment, however, each of the subpixel electrodes M1 to M4 comprises a transmissive electrode 73a and a reflective electrode 73b, and each of the transmissive electrode 73a and the reflective electrode 73b is formed so as to have a size corresponding to the weight of the corresponding bit of digital image data.

This configuration enables the liquid crystal display device to have both features of a transmissive type liquid crystal display device and a reflective type liquid crystal display device. In particular, in the case of reflective-type, when the source lines SL, the gate lines GL, the pixel transistors Tr1 to Tr4, and the voltage controlling capacitors C1 to C4 are provided under the reflective pixel electrodes 73b, large-sized reflective pixel electrodes are provided. Furthermore, the occurrence of persistent patterns is suppressed, and a liquid crystal display device is achieved in which the gray levels of the displayed images are smooth.

For the method of driving the liquid crystal display device, an error diffusion method may be employed. In addition to the pixel configuration such that the centroids of all the subpixel electrodes in each unit pixel are in proximity to or match each other, the use of an error diffusion method achieves further improved gray scale display with good image quality.

Embodiment 15

Embodiment 15 pertains to a method of evaluating the influence of subpixel arrangement patterns (e.g., the above-described pattern of the two rectangular-shaped subpixel electrode portions arranged parallel to each other, the above-described square frame-shaped pattern, and the like) on display characteristics. More specifically, Embodiment 15 pertains to a method of evaluating the occurrence of image defects such as gray scale inversion and persistent patterns by the following manner. Subpixel arrangement patterns are inputted into an evaluating apparatus such as a simulator, then a predetermined original image is displayed based on the subpixel arrangement patterns, and the image displayed based on the subpixel arrangement patterns are outputted from the evaluating apparatus for visual observation to determine whether the occurrence of image defects such as gray scale inversion and persistent patterns exists. This evaluation method makes it possible to obtain optimum settings of subpixel arrangements patterns. The details are presented below with reference to FIGS. 27 to 29.

Figure 27:
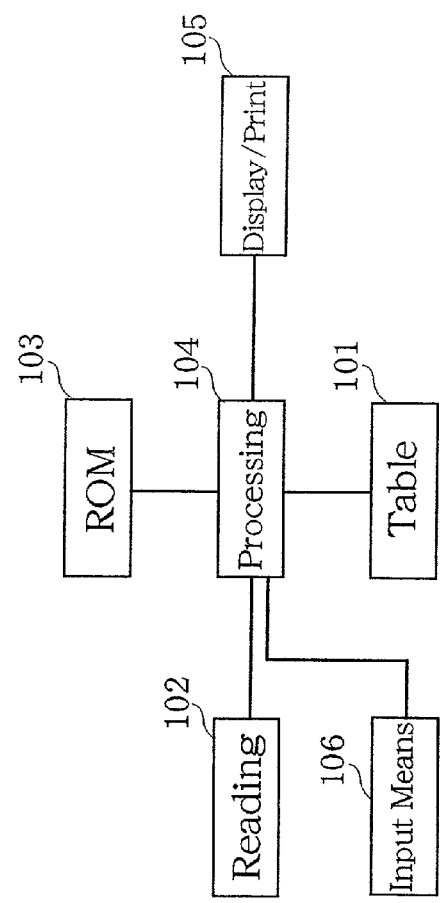
FIG. 27 is a block diagram showing the electrical configuration of an evaluating apparatus used in Embodiment 15.
Figure 28:
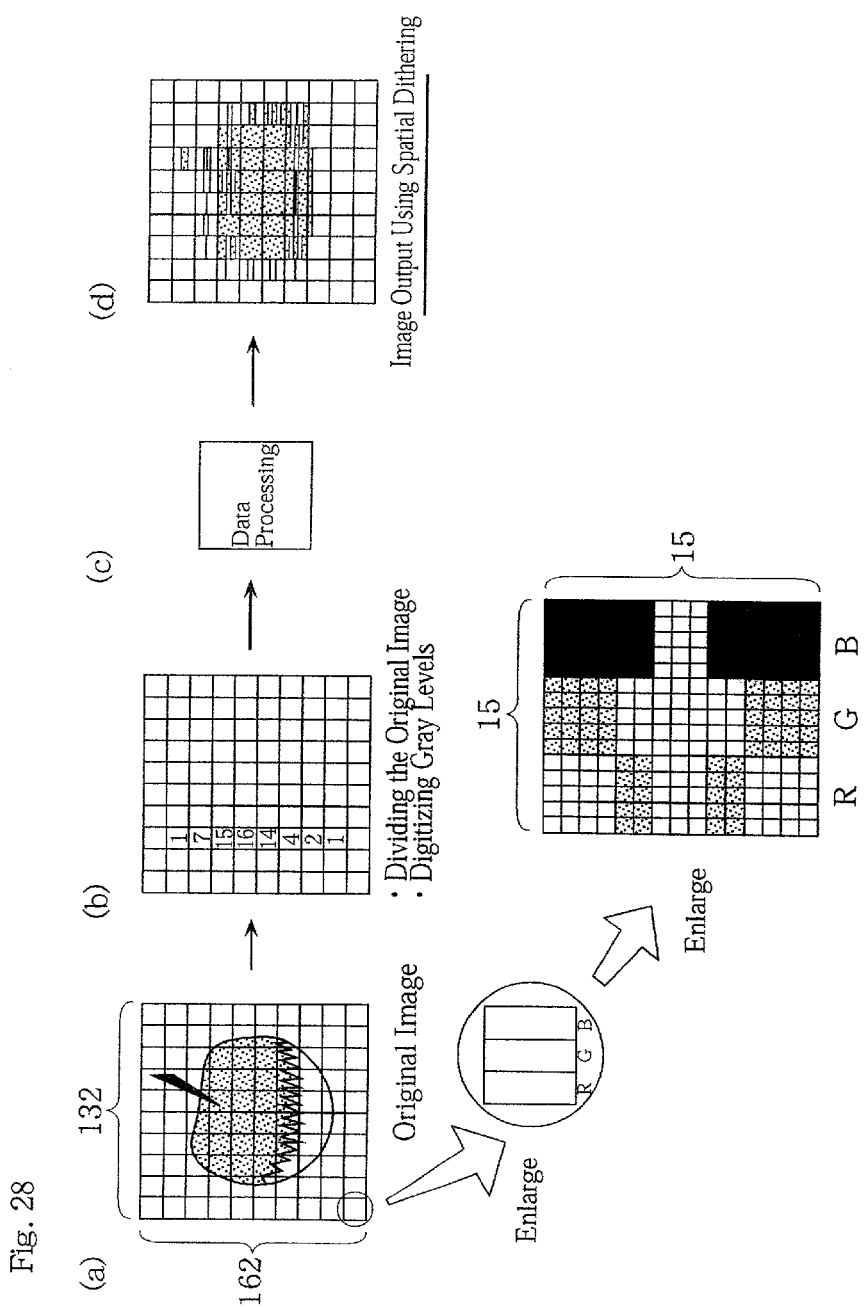
FIG. 28 illustrates image processing in an evaluating apparatus used in Embodiment 15.
Figure 29:
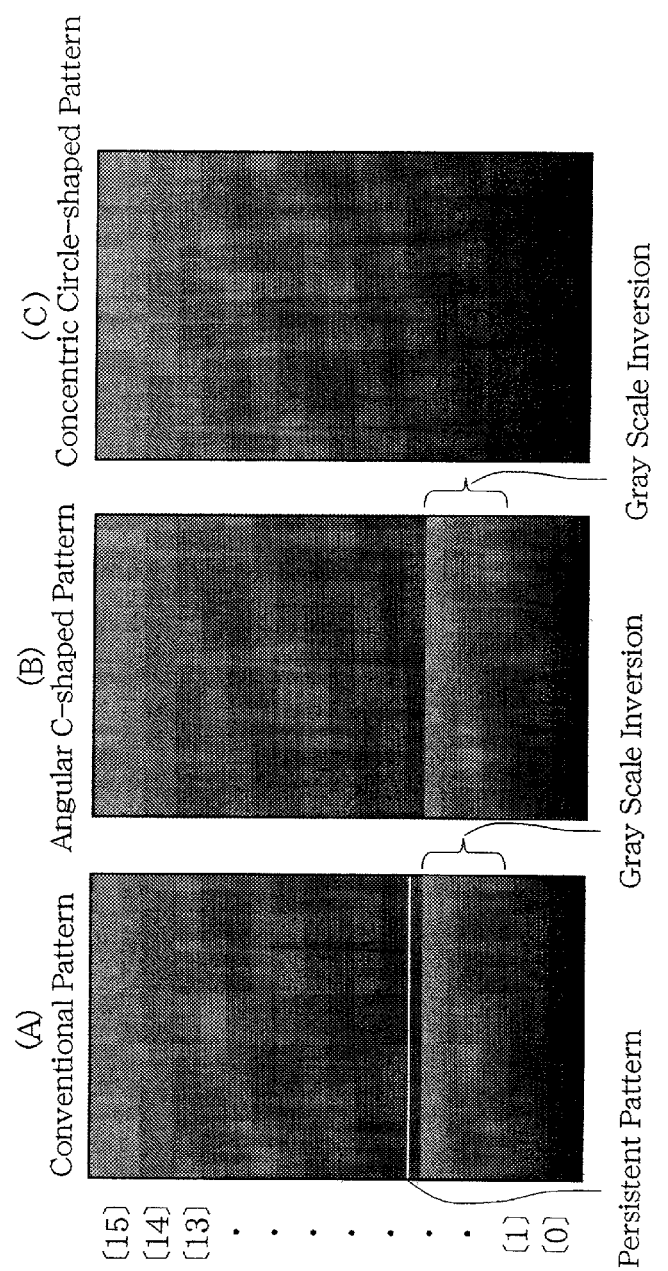
FIGS. 29A to 29C illustrate output images showing the results of simulation obtained by the evaluating apparatus used in Embodiment 15.

FIG. 27 shows a block diagram of electrical configuration of an evaluating apparatus used for the present Embodiment 27. FIG. 28 shows the concept of image processing in the evaluating apparatus. FIGS. 29A to 29C illustrate output images showing the simulation results.

An evaluating apparatus 100 used in the present embodiment comprises a reading means 102 for reading original images, an input means 106 for inputting subpixel arrangement patterns (for example, a pattern in which two rectangular portions are arranged parallel to each other, as depicted in FIG. 21) corresponding to gray levels, a table 101 for storing the subpixel arrangement patterns inputted by the input means 106 in a dotmap-like form, a processing circuit 104 for performing a predetermined image processing based on the subpixel arrangement patterns stored in the table 101, a displaying/printing means 105 for outputting the gray scale display images by displaying/printing, and a ROM 103 for storing predetermined system programs and the like.

Referring now to FIG. 28, an evaluating method utilizing the evaluating apparatus 100 is discussed below.

First, by the input means 106, a subpixel arrangement pattern, which is to be evaluated, is inputted. Thereby, the subpixel arrangement pattern is stored in the table 101. Subsequently, the reading means 102 reads an original image, as depicted in (a) in FIG. 28. The read original image is divided into very small regions forming a matrix, for example, 162×132 regions, and then digitized by determining gray levels in the divided regions (see (b) in FIG. 28). It is to be noted that FIG. 28 shows a case of 16 gray scale display, and the numerals such as "1" and "7" in (b) in FIG. 28 represent gray levels.

Subsequently, for each divided region, the subpixel arrangement pattern corresponding to the gray level is read out from the table 101 to convert the original image into a gray scale display image based on the subpixel arrangement patterns. Thereafter, the converted gray scale display image is outputted by the displaying/printing means 105. Then, the outputted image from the displaying/printing means 105 is visually observed to evaluate the occurrence of gray scale inversion and the positions and sizes of the gray scale inversion. At the same time, the occurrence of persistent patterns and the positions and sizes of the persistent patterns are also evaluated by the visual observation. This achieves an evaluation of the influences of subpixel arrangement patterns on display characteristics and makes it possible to select the optimum subpixel arrangement pattern according to the number of gray levels, characteristics of original images (for example, whether or not the original image has a large white portion), and the like. The original images need not be black and white images but may be color images, and if this is the case, a similar image processing is possible by dividing the original image for each R, G, B, as shown in FIG. 28.

The present inventors carried out a simulation using three subpixel arrangement patterns, and the results of the simulation are shown in FIGS. 29A to 29C. The original image was such that the gray level of black and white shades sequentially increases from the bottom to the top. FIG. 29A shows an output image in the case in which the subpixel arrangement pattern was a conventional pattern. FIG. 29B shows an output image in the case in which the subpixel arrangement pattern was a substantially angular C-shaped pattern. FIG. 29C shows an output image in the case in which the subpixel arrangement pattern was a concentric circle-shaped pattern. In FIG. 29A, it is recognized that both a gray scale inversion and a persistent pattern occurred. In FIG. 29B, it is recognized that while a persistent pattern did not appear, a gray scale inversion was still present. In FIG. 29C, neither gray scale inversions nor persistent patterns occurred.

These results are attributed to the following reasons.

In FIGS. 29B and 29C, the persistent patterns were not observed because the centroids of subpixels substantially matched each other by employing the subpixel arrangement patterns such as substantially angular C-shaped patterns and concentric circle shaped patterns. Gray scale inversion was observed in FIG. 29B but not in FIG. 29C. This is attributed to the fact that while the angular C-shaped pattern performs one dimensional spatial dithering (in the vertical direction of the original image), the concentric circle shaped pattern performs two dimensional spatial dithering (in the vertical and lateral directions of the original image). Therefore, it is determined that the optimum subpixel arrangement pattern in this case is the concentric circle shaped pattern.

In the above-described simulation, an angular C-shaped pattern and a concentric circle shaped pattern were evaluated, but it is to be understood that the above-described method can be used to evaluate various types of subpixel arrangement patterns other than those.

Thus, the evaluating method according to the present embodiment makes it possible to evaluate the influence of subpixel arrangement patterns on display characteristics, to predetermine an optimum subpixel pattern that achieves output images with optimum display characteristics under various conditions, and accordingly to easily select a subpixel arrangement pattern.

Supplementary Remarks for Embodiment 15

(1) The shapes of the subpixel electrodes in a unit pixel are not limited to those described in the present embodiment but may be other shapes insofar as the centroids of all the pixel electrodes are in close proximity to each other or match each other. For example, circular patterns or triangular patterns may also be employed.

(2) The configurations of the present invention are also suitably applied to image display devices other than the liquid crystal display devices as described in the present embodiment, for example to organic light emitting elements, plasma display devices, or the like. In addition, such image display devices can be suitably applied to information terminal devices, such as mobile telephones and notebook computers.

(3) The area ratio of the subpixel electrodes in a unit pixel may be other than the ratio 1:2:4:8.

(4) As in the present invention, when subpixels are provided in unit pixels, the sizes of controlling capacitors in the smallest subpixels are required to be very small because the sizes of the subpixels are inevitably small. As a result, the pixel electrode potential variations caused by leakage current in the TFTs are large. To compensate the variations, additional storage capacitors or the like may be provided.

The above supplementary remarks may also be applicable to the other embodiments herein.

Embodiment 16

Figure 30:
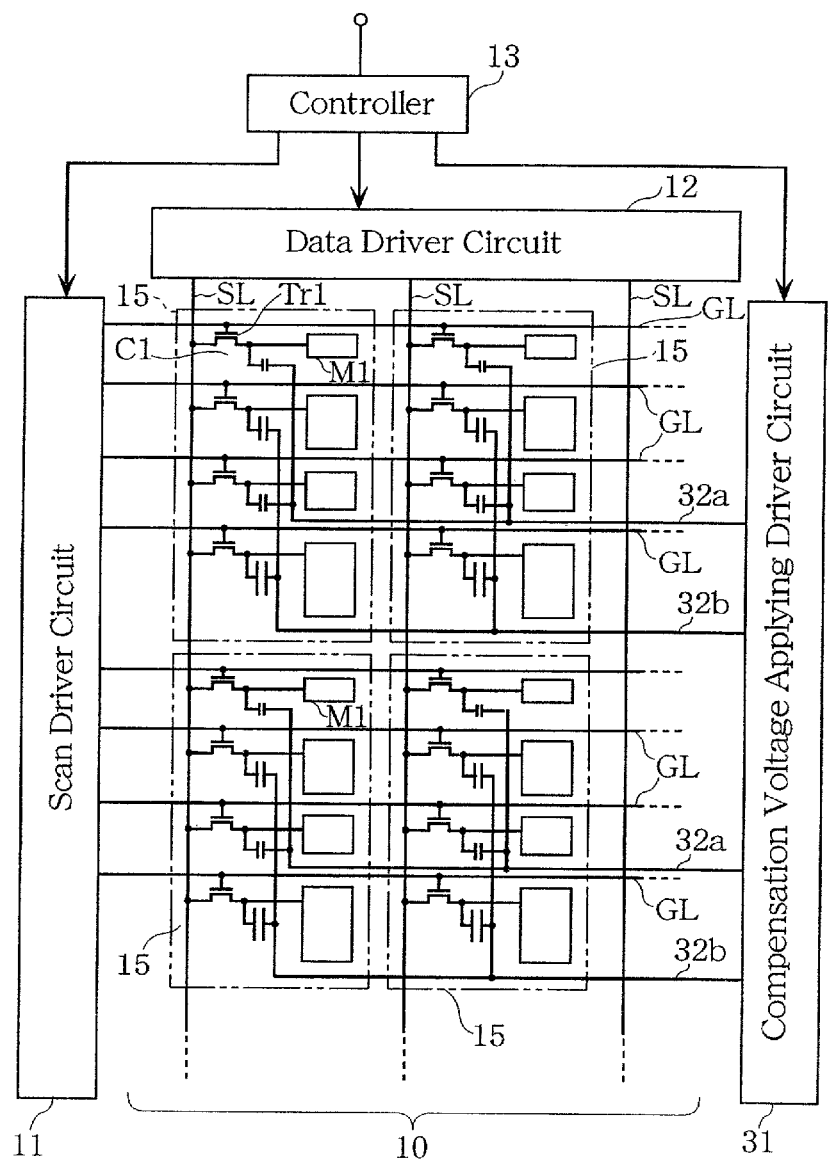
FIG. 30 is a circuit diagram of a liquid crystal display device in accordance with Embodiment 16.
Figure 31:
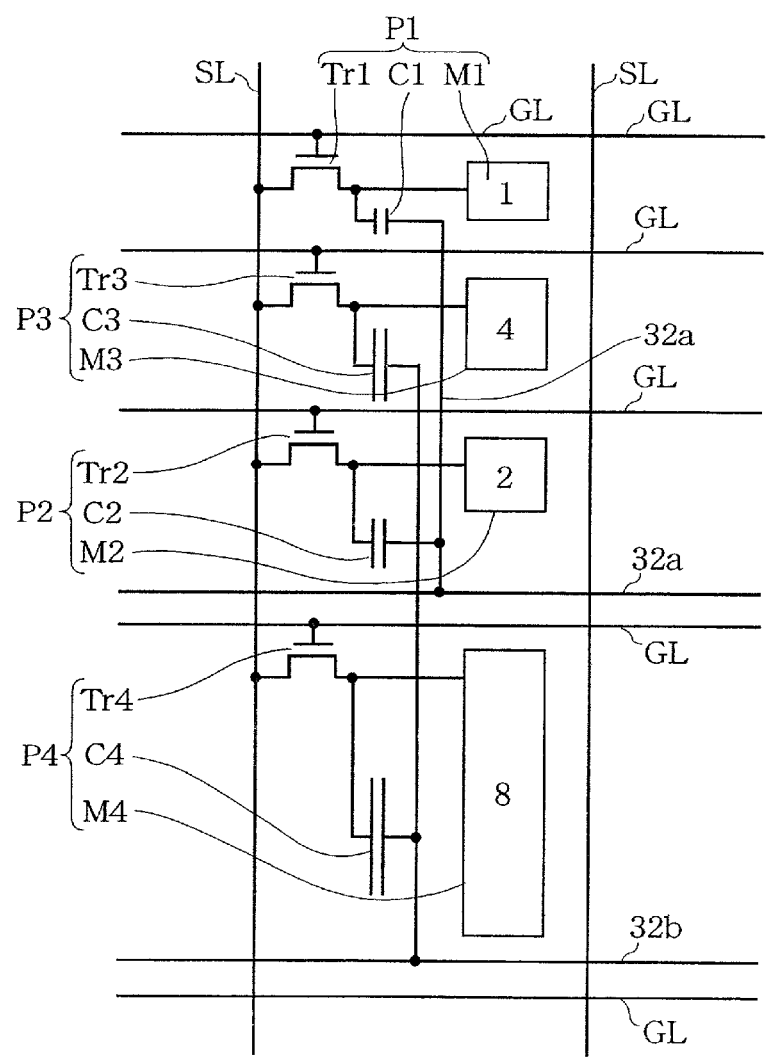
FIG. 31 is a circuit diagram showing the configuration of a unit pixel in the liquid crystal display device of Embodiment 16.

FIG. 30 shows a circuit diagram of a liquid crystal display device according to Embodiment 16, and FIG. 31 shows a circuit diagram of a unit pixel thereof. Similar parts to the foregoing Embodiment 1 are designated by like reference numerals and will not be further elaborated upon. Embodiment 16 is characterized in that interlaced scan is performed in the display operation.

In the foregoing Embodiment 1, the subpixels P1 to P4 in a unit pixel are arranged in the order P1, P2, P3, P4, from the top to the bottom. In the present Embodiment 16, they are arranged in the order P1, P3, P2, P4. Accordingly, the area ratio of the subpixel electrodes is as follows: the area of the subpixel electrode M1: the area of the subpixel electrode M3: the area of the subpixel electrode M2: the area of the subpixel electrode M4=1:2:4:8. The first binary bit of the 4-bit image data corresponds to the subpixel P1, the second binary bit to the subpixel P3, the third binary bit to the subpixel P2, and the fourth binary bit to the subpixel P4. The voltage controlling capacitors are also so formed to have corresponding capacitance values as follows: the voltage controlling capacitance C1: the voltage controlling capacitance C3: the voltage controlling capacitance C2: the voltage controlling capacitance C4=1:2:4:8.

In the liquid crystal display device of the present Embodiment 16, two voltage controlling capacitor lines 32a and 32b are provided for each unit pixel 15. The voltage controlling capacitor line 32a is connected, via a common connecting line 33a, to voltage controlling capacitors C1 and C2 in the respective subpixels P1 and P2, which are located in the odd-numbered rows. The voltage controlling capacitor line 32b is, on the other hand, connected, via a common connecting line 33b, to voltage controlling capacitors C3 and C4 in the respective subpixels P3 and P4, which are located in the even-numbered rows. Such a wiring configuration makes it possible to supply a compensation voltage signal to the voltage controlling capacitors C1 and C2 via the common connecting line 33a and to the voltage controlling capacitors C3 and C4 via the common connecting line 33b. Thereby, image quality degradation caused by punch-through voltage is prevented. In addition, by providing independent voltage controlling capacitor lines 33a and 33b, the voltage in the scan driver circuit 11 is reduced, in comparison with the configuration in which a scanning signal and a compensation voltage are superimposed in a gate line (such as the one disclosed in Japanese Unexamined Patent Publication No. 2-157815).

The display operation of the liquid crystal display device according to the present embodiment is now described below. A feature of the present embodiment is that display operation is achieved by interlaced scan. Specifically, each frame is constituted by two fields, field A and field B, and display operation is performed in such a manner that in the field A, an image corresponding to data in the odd-numbered rows is displayed, whereas in the field B, an image corresponding to data in the even-numbered rows is displayed.

Figure 32:
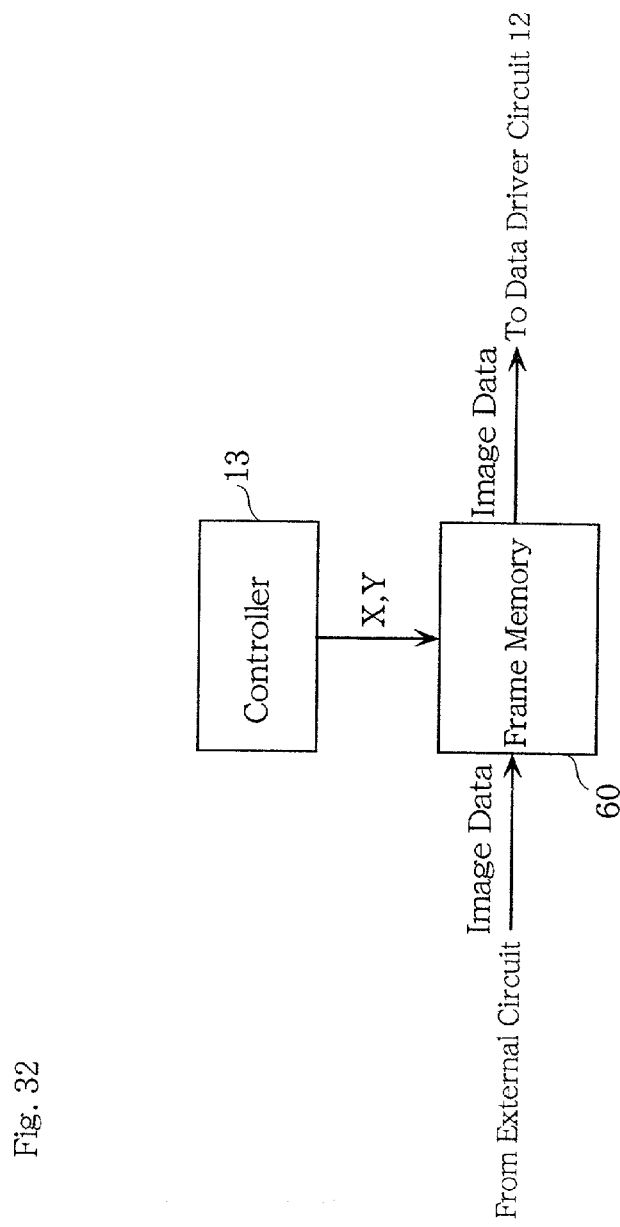
FIG. 32 is a circuit diagram related to a frame memory 60 of the liquid crystal display device of Embodiment 16.

The image display corresponding to the odd-numbered rows and the image display corresponding to the even-numbered rows are carried out by reading out image data stored in a frame memory 60, as shown in FIG. 32. Specifically, the configuration is such that the frame memory 60 stores image data for a single frame to be displayed, and that a controller 13 feeds to the frame memory 60, during a field A period, a control signal X for reading out the image data for the odd-numbered rows, and during a field B period, a control signal Y for reading out the image data for the even-numbered rows. As a consequence, during a field A period, image data for odd-numbered rows are supplied to the data lines, and simultaneously, the scan driver circuit 11 sequentially selects the scanning lines in the odd-numbered rows in response to an addressing signal supplied from the controller 13. On the other hand, during a field B period, image data for even-numbered rows are supplied to the data lines, and simultaneously, the scan driver circuit 11 sequentially selects the scanning lines in the even-numbered rows in response to an addressing signal supplied from the controller 13. Thus, this configuration achieves a display operation using interlaced scan.

Figure 33:
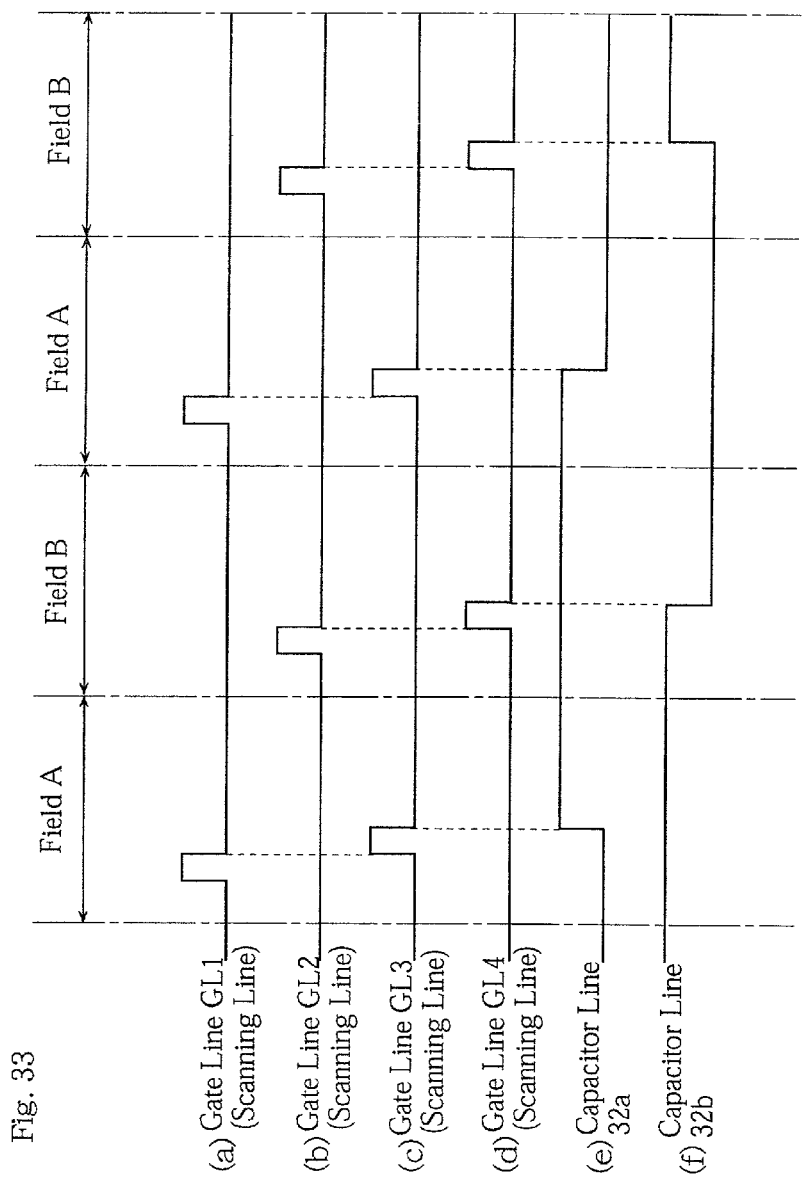
FIG. 33 is a timing chart illustrating the operation of interlaced scan of the liquid crystal display device of Embodiment 16.

Referring now to FIG. 33, an example of display operation using interlaced scan is specifically described. FIG. 33 shows a timing chart for a given pixel. First, during a field A period, the first scanning line is selected as shown by (a) in FIG. 33, and image data are written to the subpixels that are connected to the first scanning line (the subpixels P1 in the first row). After the writing to the subpixels in the first row has been completed, the third scanning line is selected as shown by (c) in FIG. 33, and image data are written to the subpixels that are connected to the third scanning line (the subpixels P2 in the third row). After the writing to the subpixels in the third row has been completed, a compensation voltage signal is shifted to the high potential side, as shown by (e) in FIG. 33. Thereby, using the first voltage controlling capacitor line 32a, the potentials of the subpixel electrodes M1, M2 are modulated to predetermined potentials. Consequently, a positive polarity voltage is applied to the subpixels P1, P2 in the first and third rows.

The compensation voltage signal shifted to the high potential side maintains a high potential until it is shifted to the low potential side in the subsequent field A.

It is to be noted that FIG. 33 depicts only a timing chart for a single row of the unit pixels including the first to the fourth rows but a similar operation for these unit pixels including the first to the fourth rows is performed for the unit pixels including the fifth to the eighth rows, the unit pixels including the ninth to the 12th rows, . . . through the unit pixels including the lowermost row. As a result, an image corresponding to the image data for the odd-numbered rows is displayed during a field A period.

Next, during a field B period, the second scanning line is selected as shown by (b) in FIG. 33, and image data are written to the subpixels that are connected to the second scanning line (the subpixels P3 in the second row). After the writing to the subpixels in the second row has been completed, the fourth scanning line is selected as shown by (d) in FIG. 33, and image data are written to the subpixels that are connected to the fourth scanning line (the subpixels P4 in the fourth row). After the writing to the subpixels in the fourth row has been completed, a compensation voltage signal is shifted to the low potential side, as shown by (f) in FIG. 33. Thereby, the potentials of the subpixel electrodes M3, M4 are modulated to predetermined potentials. Consequently, a negative polarity voltage is applied to the subpixels P3, P4 in the second and fourth rows. The compensation voltage signal shifted to the low potential side maintains a low potential until it is shifted to the high potential side in the subsequent field B.

Subsequently, a similar operation to the operation for these unit pixels including the first to the fourth rows is performed for the unit pixels including the fifth to the eighth rows, the unit pixels including the ninth to the 12th rows, . . . through the unit pixels including the lowermost row. As a result, an image corresponding to the image data for the even-numbered rows is displayed during a field B period.

Thus, by employing interlaced scan for display operation, the power consumption is reduced because the amount of the data to be written at one time is ½ of that for an entire frame.

Furthermore, the above-described driving method attains 1H inversion driving, in which voltage polarities are reversed every other row (every other row of subpixels in the present embodiment), and therefore, flicker in the displayed image is eliminated.

Embodiment 17

Figure 34:
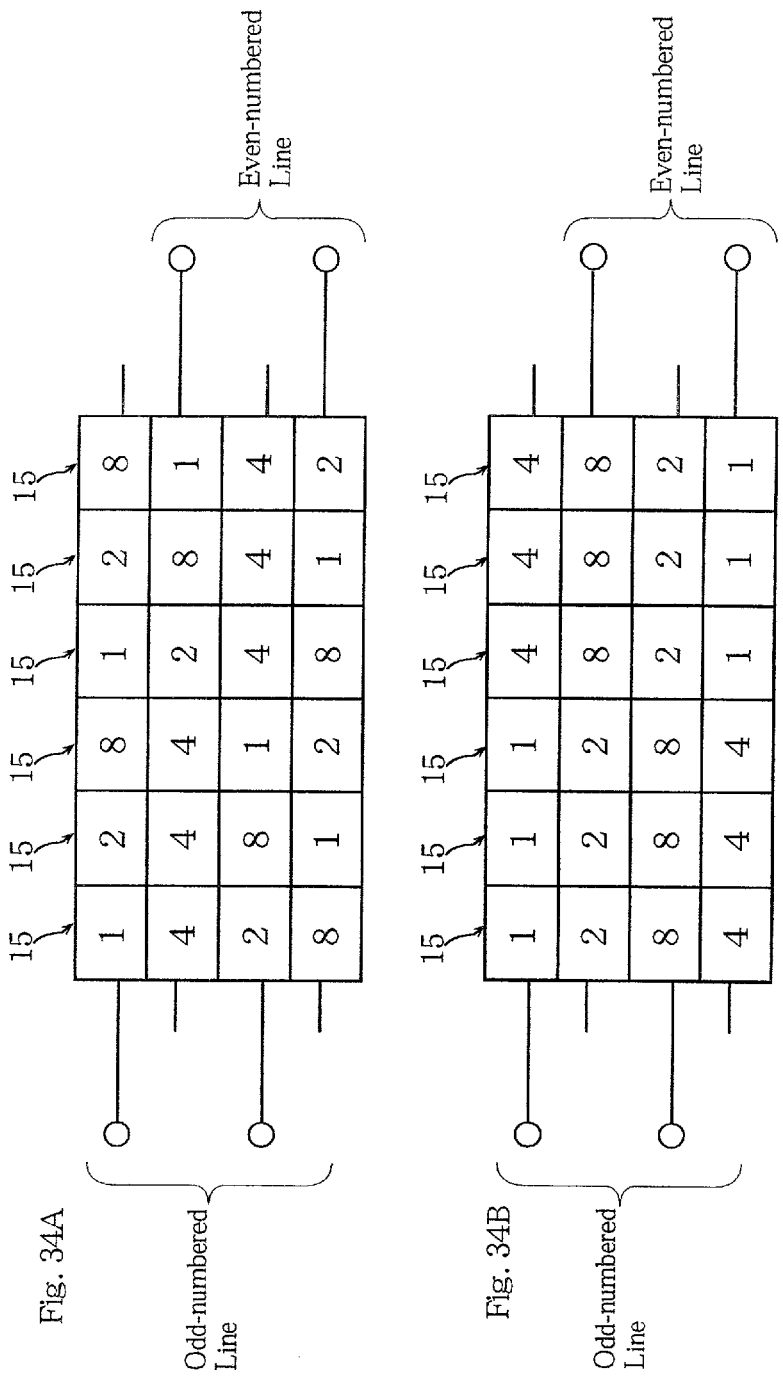
FIGS. 34A and 34B show an arrangements of subpixel electrodes in a black and white liquid crystal display device in accordance with Embodiment 17.

Embodiment 17 is characterized in that the subpixel electrodes are disposed according to predetermined arrangements. Specifically, in a case of a black-and-white liquid crystal display, (1) as shown in FIG. 34B, in a row of the unit pixels, the total area of the subpixel electrodes in the odd-numbered rows of the subpixels is substantially equal to the total area of the subpixel electrodes in the even-numbered rows of the subpixels, or (2) as shown in FIG. 34A, in a row of the unit pixels, all the rows of the subpixels have the same total area of the subpixel electrodes. The numerals in FIGS. 34A and 34B such as "1", "2", "4", and "8" represent electrode areas. Note that each of FIGS. 34A and 34B depicts only six unit pixels 15 (subpixels for 4 rows and 6 columns), but the entire display area has such an arrangement.

This subpixel arrangement configuration minimizes the occurrence of flicker.

Figure 35:
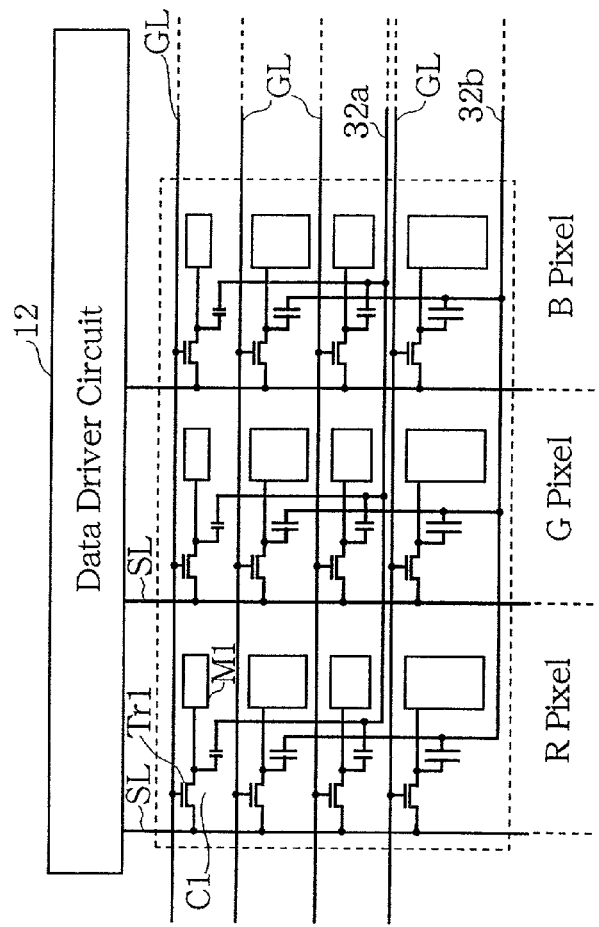
FIG. 35 shows a configuration of unit pixels in a color liquid crystal display device in accordance with Embodiment 17.
Figure 36A:
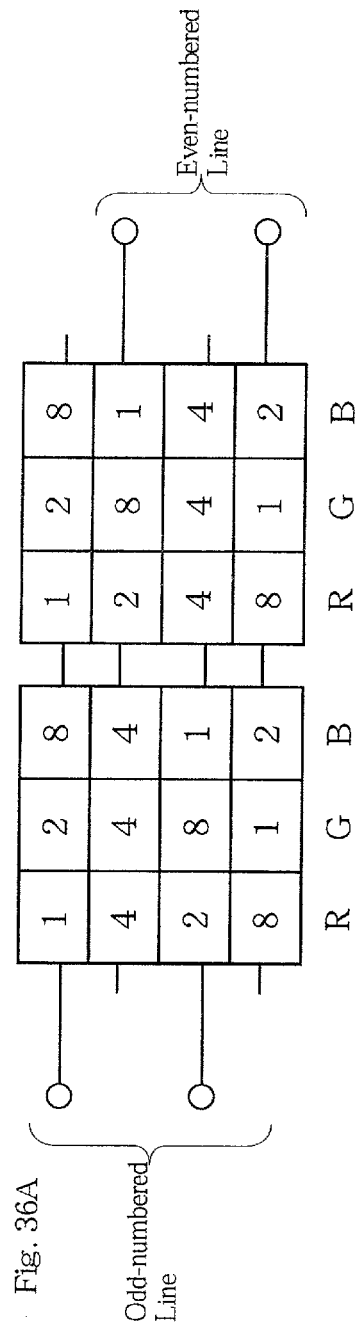
FIG. 36A and 36B show the arrangement of subpixel electrodes in the color liquid crystal display device in accordance with Embodiment 17.
Figure 36B:
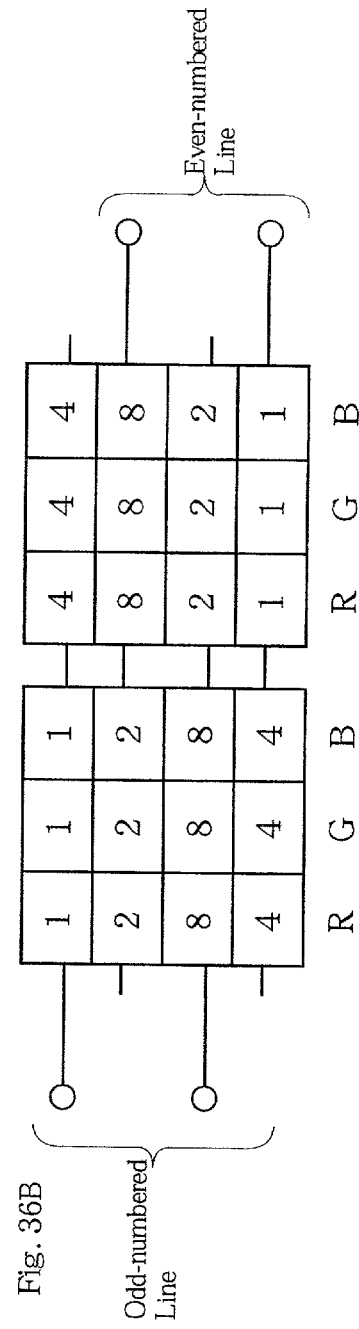

In a case of a full color liquid crystal display device such as shown in FIG. 35, the arrangement of FIG. 36B should be used for the arrangement of (1) described above and the arrangement of FIG. 36A for the arrangement of (2) described above. In FIGS. 36A and 36B too, the numerals therein such as "1", "2", "4", and "8" represent electrode areas.

Embodiment 18

A liquid crystal display device according to Embodiment 18 is so configured that progressive scan can be performed in addition to interlaced scan, and when displaying still pictures, interlaced scan is performed whereas when displaying moving pictures, progressive scan is performed. The details of Embodiment 18 are presented below.

Figure 37:
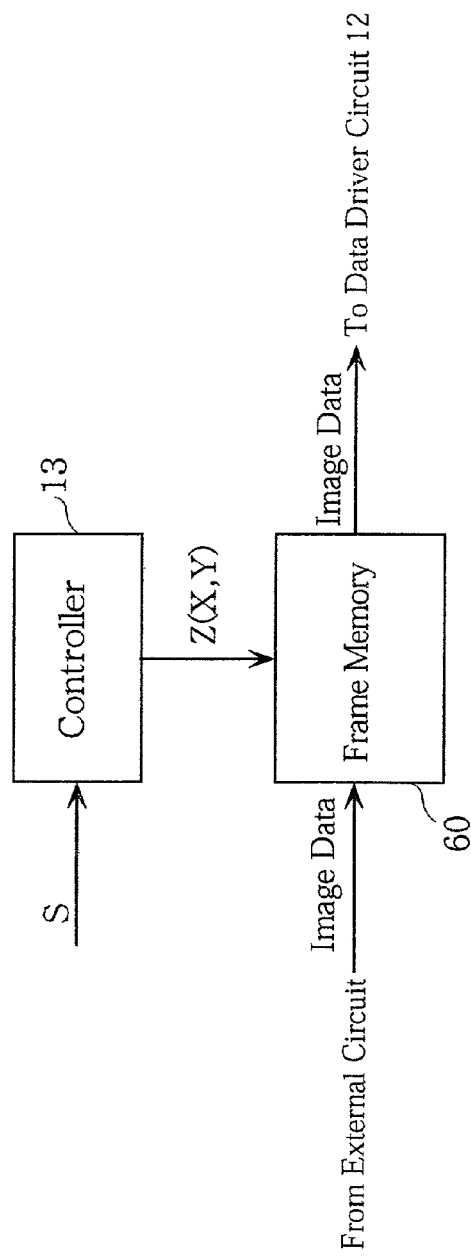
FIG. 37 is a circuit diagram related to a frame memory 60 of the liquid crystal display device of Embodiment 18.

First, display operation for progressive scan is discussed with reference to FIG. 37. In the case of progressive scan, a controller supplies to a frame memory 60 a controlling signal Z for reading out all the data for an image, and from the frame memory 60, all the image data, including the data for the first row, the data for the second row, . . . through the data for the last row, are sequentially read out and supplied to data lines. Simultaneously, the scan driver circuit sequentially selects all the scanning lines, from the first scanning line through the last scanning line. Thus, display operation using progressive scan is performed.

Figure 38:
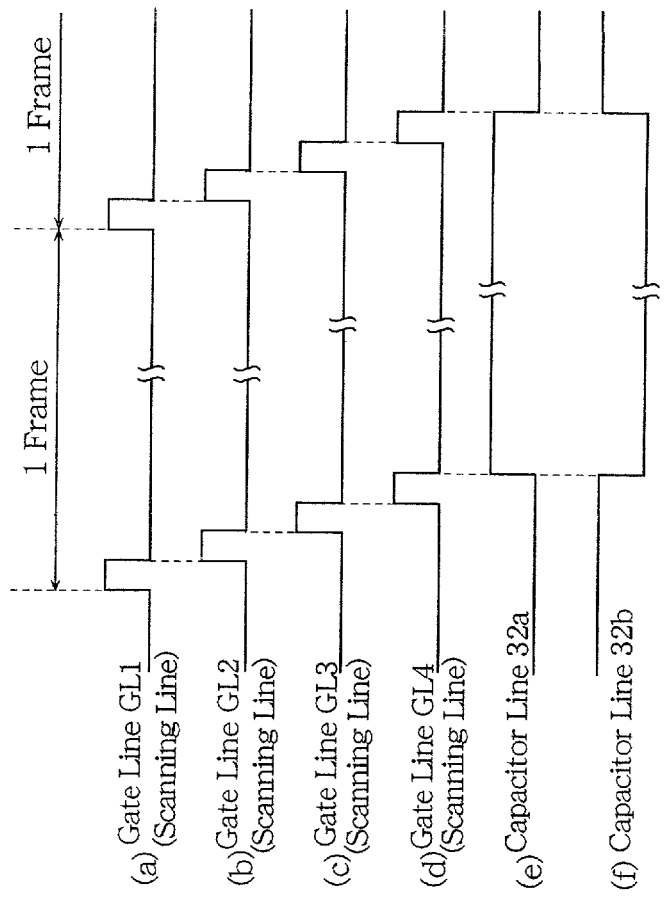
FIG. 38 is a timing chart illustrating the operation of progressive scan of the liquid crystal display device of Embodiment 18.
Figure 39:
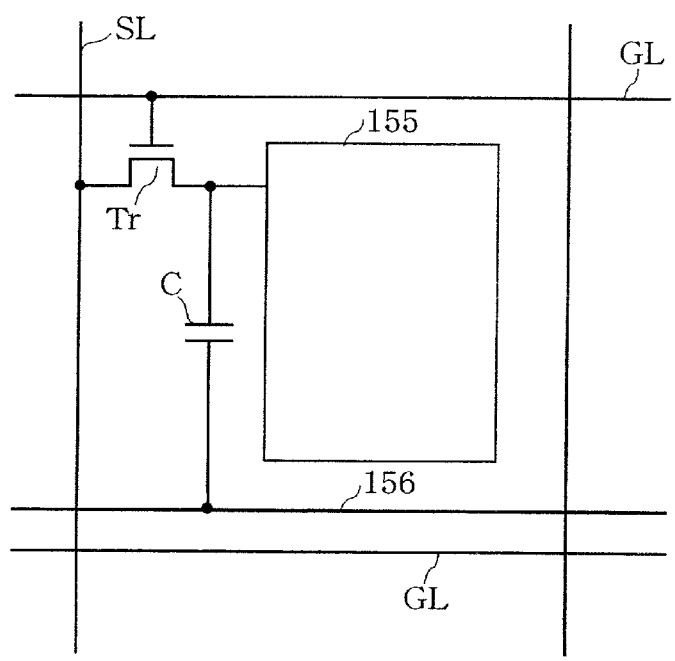
FIG. 39 is a circuit diagram showing the configuration of a pixel in a prior-art active matrix liquid crystal display panel.

Referring now to FIG. 38, display operation using progressive scan is described. FIG. 38 is a timing chart for a single pixel. As shown by (a) to (d) in FIG. 38, the first to the fourth scanning lines are sequentially selected, and image data are sequentially written to the subpixels in the first to the fourth rows. After the writing to the subpixels in the fourth row has been completed, the compensation voltage signal applied via the first voltage controlling capacitor line 32a is shifted to the high potential side, as shown by (e) in FIG. 38, and simultaneously, the compensation voltage signal applied via the second voltage controlling capacitor line 32b is shifted to the low potential side, as shown by (f) in FIG. 38. Thereby, the potentials of the subpixel electrodes M1, M2 in the odd-numbered rows are modulated to predetermined potentials via the first voltage controlling capacitor line 32a, and the potentials of the subpixel electrodes M3, M4 in the even-numbered rows are modulated to predetermined potentials via the second voltage controlling capacitor line 32b. Consequently, a positive polarity voltage is applied to the subpixels P1, P2 in the first and the third rows, whereas a negative polarity voltage is applied to the subpixels P3, P4 in the second and the fourth rows.

It is to be understood that FIG. 38 depicts only a timing chart for a single unit pixel row, but a similar operation is performed for the subsequent rows, from the fifth row to the lowermost row.

Thus, display operation using progressive scan is performed, attaining 1H inversion driving, in which voltage polarities are reversed every other row (every other row of subpixels in the present embodiment).

Next, switching operation from progressive scan to interlaced scan is described. When the controller 13 receives an identifying signal S for identifying whether the image to be displayed is a still picture or a moving picture, the controller 13 performs controlling operation according to the identifying signal S. Specifically, when the identifying signal S is for the still picture, the controller 13 controls such operations as reading out to the frame memory 60, controlling of the selecting sequence in the scan driver circuit 11, and varying timing of the compensation voltage in the compensation voltage applying driver circuit 31 in order that interlaced scan is performed. Thus, display operation using interlaced scan is attained.

When the identifying signal S is for the moving picture, the controller 13 controls such operations as reading out to the frame memory 60, controlling of the selecting sequence in the scan driver circuit 11, and varying timing of the compensation voltage in the compensation voltage applying driver circuit 31 in order that progressive scan is performed. Thus, display operation using progressive scan is attained. When progressive scan is used in the display operation, the power consumption is greater than the case of interlaced scan because data for the whole image must be written at one time, but an increased resolution is achieved and clearer image is obtained because the amount of written data at one time is larger than that in the case of interlaced scan.

Thus, in the present embodiment, when displaying a still picture, power consumption is reduced by performing interlaced scan, and when displaying a moving picture, clear images with an increased resolution are obtained by performing progressive scan.

Supplementary Remarks for Embodiment 18

(1) The description of the present embodiment has discussed an example using 4-bit data (16 gray levels), but the present invention is not limited thereto. Each unit pixel may comprise 5 or 6, or even more subpixels to display multi-gray level images using 5-bit data (32 gray levels), 6-bit data (64 gray levels), or multiple gray scale display with more gray levels.

The liquid crystal display devices according to the above Embodiment may be suitably applied to both transmissive and reflective type liquid crystal display devices. In particular, in cases of reflective-type liquid crystal display devices, it is possible to provide large subpixel regions by disposing source lines SL, gate lines GL, pixel transistors Tr, and voltage controlling capacitors C under the reflective pixel electrodes.

(3) In the present embodiment, the scan driver circuit 11 is formed of polycrystalline silicon and the data driver circuit 12 is formed of single crystal silicon, but the present invention is not limited thereto. Both the scan driver circuit 11 and the data driver circuit 12 may be formed of polycrystalline silicon.

(4) The liquid crystal display devices according to the present invention may be suitably applied to display devices for information terminal devices such as mobile telephones.

The above supplementary remarks may also be applicable to the other embodiments herein.

While the present invention has been described with respect to preferred embodiments thereof, such description is for illustrative purposes only, and is not to be construed as limiting the scope of the invention. Various modifications and changes may be made to the described embodiments by those skilled in the art without departing from the true spirit and scope of the invention as defined by the appended claims.

What is claimed is:

1. A liquid crystal display device comprising a plurality of scanning lines and plurality of data lines, a scan driver circuit for supplying a scanning signal to said scanning lines, the scan driver circuit comprising polycrystalline silicon, a data driver circuit for supplying digital image data to said data lines, the data driver circuit comprising single crystal silicon, the digital image data having a plurality of binary bits, and a plurality of unit pixels arranged in a matrix configuration, the liquid crystal display device comprising:

each of the unit pixels comprising a plurality of subpixels, each of the subpixels comprising a subpixel electrode, a switching element connected to the subpixel electrode, and a voltage controlling capacitor connected to the subpixel electrode; and a plurality of voltage controlling capacitor lines for supplying a compensation voltage signal, each of the voltage controlling capacitor lines being connected to the voltage controlling capacitors in each of the unit pixels; wherein potentials of the subpixel electrodes are for being modulated by varying the potential of such a compensation voltage signal after writing to the subpixels has been completed.

2. The liquid crystal display device according to claim 1, wherein in each of the unit pixels, the scanning lines are individually wired for each subpixel of a unit pixel and one of the data lines is commonly wired for all the subpixels of a unit pixel.

3. The liquid crystal display device according to claim 2, wherein each of the subpixel electrodes comprises an electrode area that corresponds to the weight of the corresponding binary bit of the digital image data.

4. The liquid crystal display device according to claim 2, wherein each of the switching elements in each of the unit pixels comprises a thin film transistor, and the thin film transistor has an ON current performance that corresponds to the weight of the corresponding binary bit of the digital image data.

5. The liquid crystal display device according to claim 2, wherein each of the voltage controlling capacitors in each of the unit pixels has a capacitance value that corresponds to the weight of the corresponding binary bit of the digital image data.

6. The liquid crystal display device according to claim 2, further comprising, in each subpixel, a storage capacitor located between each of the subpixel electrode and a scanning line immediately electrically upstream of the storage capacitor.

7. The liquid crystal display device according to claim 6, wherein a capacitance value of the voltage controlling capacitor comprises a value in the range of 0.6 to 1.4 times that of the capacitance Cc defined by the following equation:

$$Cc=\{(Vbias/Vepp-Vbias)\}\cdot(Clc+Cgd)$$

where Vbias is the amount of pixel voltage variation caused by variation of a compensation voltage, Vepp is an amplitude of such a compensation voltage signal, Clc is liquid crystal capacitance, and Cgd is parasitic capacitance of the switching element.

8. The liquid crystal display device according to claim 2, wherein in each of the unit pixels, centroids of the areas of the subpixel electrodes are located at substantially the same position.

9. The liquid crystal display device according to claim 8, wherein at least a first one of the subpixel electrodes is divided to comprise two substantially rectangular shaped portions arranged substantially parallel to each other, and the two substantially rectangular shaped portions of said at least first one of the subpixel electrodes are located to sandwich at least a second one of the subpixel electrodes other than said at least first one of the subpixel electrodes.

10. The liquid crystal display device according to claim 9, wherein the two substantially rectangular shaped portions of the first one subpixel electrode are electrically connected to each other.

11. The liquid crystal display device according to claim 8, wherein at least a first one of the subpixel electrodes has a substantially square frame shape, and said at least a first one of the subpixel electrodes is located to surround at least a second one of the subpixel electrodes other than said at least first one of the subpixel electrodes.

12. The liquid crystal display device according to claim 8, wherein in each of the unit pixels, a first subpixel electrode having the largest electrode area among the subpixels electrodes has a substantially square frame shape, and at least one of the subpixel electrodes other than said first pixel electrode is located inside the square frame shaped subpixel electrode and has two substantially rectangular shaped portions arranged substantially parallel to each other.

13. The liquid crystal display device according to claim 2, wherein the subpixel electrode comprises a reflective electrode.

14. The liquid crystal display device according to claim 2, wherein a portion of the subpixel electrode comprises a transmissive electrode.

15. The liquid crystal display device according to claim 2, wherein:

each of the unit pixels comprises two of the voltage controlling capacitor lines;

one of the two voltage controlling capacitor lines is connected to the voltage controlling capacitors in odd-numbered rows of the subpixels in each of the unit pixels, and;

the other one of the two voltage controlling capacitor lines is connected to the voltage controlling capacitors in even-numbered rows of the subpixels in each of the unit pixels.

16. The liquid crystal display device according to claim 15, wherein the total area of the subpixel electrodes in the odd-numbered rows of the subpixels in a row of the unit pixels is substantially equal to the total area of the subpixel electrodes in the even-numbered rows of the subpixels in a row of the unit pixels.

17. The liquid crystal display device according to claim 15, wherein all the rows of the subpixels have substantially the same total area of the subpixel electrodes in a row of the unit pixels.

18. The liquid crystal display device according to claim 2, wherein the scanning lines and the voltage controlling capacitor lines comprise the same wiring material.

19. An information terminal device comprising in combination therewith the electroluminescent display device according to claim 18.

20. An information terminal device comprising in combination therewith the liquid crystal display device according to claim 2.

21. The liquid crystal display device according to claim 1, wherein the switching element is a thin film transistor comprising polycrystalline silicon.

22. An electroluminescent display device comprising a scan driver circuit for supplying a scanning signal to scanning lines, the scan driver circuit comprising polycrystalline silicone, a data driver circuit for supplying digital image data to data lines, the data driver circuit comprising single crystal silicon, and a plurality of unit pixels arranged in a matrix configuration, the liquid crystal display device comprising:

each of the unit pixels comprising a plurality of subpixels each comprising a subpixel electrode and a switching element connected to the subpixel electrode; and in each of the unit pixels, the centroids of the areas of the subpixel electrodes are located at substantially the same position.

23. The electroluminescent display device according to claim 22, wherein at least a first one of the subpixel electrodes is divided to comprise two substantially rectangular portions arranged substantially parallel to each other, and the two substantially rectangular-shaped portions are located to sandwich at least a second one of the subpixel electrodes other than said at least first one of the subpixel electrodes.

24. The electroluminescent display device according to claim 23, wherein the two substantially rectangular-shaped portions arranged substantially parallel to each other are electrically connected to each other.

25. The electroluminescent display device according to claim 22, wherein at least a first one of the subpixel electrodes has a substantially square frame shape, and the one of the subpixel electrodes having a substantially square frame shape is located to surround at least a second one of the subpixel electrodes other than said at least first one of the subpixel electrodes.

26. The electroluminescent display device according to claim 22, wherein a first subpixel electrode having the largest electrode area among the subpixels electrodes in each of the unit pixels has a substantially square frame shape, and at least one of the subpixel electrodes other than said first subpixel electrode is located inside the square frame shaped subpixel electrode and has two substantially rectangular-shaped portions arranged substantially parallel to each other.

27. A method of driving a liquid crystal display device, the liquid crystal display device comprising a scan driver circuit for supplying a scanning signal to scanning lines, the scan driver circuit comprising polycrystalline silicone, a data driver circuit for supplying digital image data to data lines, the data driver circuit comprising single crystal silicon, liquid crystal material, a plurality of unit pixels each having a plurality of subpixels, each subpixel comprising a subpixel electrode, a switching element connected to the subpixel electrode, and a voltage controlling capacitor to which a compensation voltage signal is supplied via a voltage controlling capacitor line, the method comprising:
  (a) sequentially selecting scanning lines wired to the respective subpixels in a given row of the unit pixels;
  (b) applying a positive polarity image signal voltage to the subpixel electrodes;
  (c) supplying a high potential compensation voltage signal to the voltage controlling capacitor line to shift the potential of each of the subpixel electrodes to a high potential side after all the subpixels in a row of the unit pixels have been written;
  (d) subsequent to step (c), sequentially selecting scanning lines wired to the respective subpixels in another row of the unit pixels;
  (e) applying a negative polarity image signal voltage to the subpixel electrodes;
  (f) supplying a low potential compensation voltage signal to the voltage controlling capacitor line to shift the potential of each of the subpixel electrodes to a low potential side after all the subpixels in the another row of the unit pixels have been written; and
  (g) repeating the steps (a) to (f) for all the scanning lines, whereby polarities of voltage applied to the liquid crystal material are reversed every other row of the unit pixels.

28. The method of driving a liquid crystal display device according to claim 27, wherein gray scale display is performed using a combination of a spatial dithering method and an error diffusion method.

29. The method of driving a liquid crystal display device according to claim 27, wherein gray scale display is performed using a combination of a spatial dithering method and a pulse wide modulation (PWM) driving method.

30. A method of driving a liquid crystal display device, the device comprising a scan driver circuit for supplying a scanning signal to scanning lines, the scan driver circuit comprising polycrystalline silicone, a data driver circuit for supplying digital image data to data lines, the data driver circuit comprising single crystal silicon, a plurality of unit pixels arranged in a matrix configuration, each of the unit pixels comprising a plurality of subpixels, each subpixel individually comprising a subpixel electrode, a switching element connected to the subpixel electrode, and a voltage controlling capacitor, the method comprising reversing polarities written to the subpixels every other scanning line.

31. A method of driving a liquid crystal display device, the device comprising a scan driver circuit for supplying a scanning signal to scanning lines, the scan driver circuit comprising polycrystalline silicone, a data driver circuit for supplying digital image data to data lines, the data driver circuit comprising single crystal silicon, a plurality of unit pixels each having a plurality of subpixels, each subpixel comprising a voltage controlling capacitor, the voltage controlling capacitors in an odd-numbered row being connected to a voltage controlling capacitor line, and the voltage controlling capacitors in an even-numbered row being connected to another voltage controlling capacitor line, the method comprising:
  providing a frame comprising a first field and a second field;
  in the first field, (a) sequentially scanning the subpixels in odd-numbered rows in the unit pixels, (b) applying an image signal to the subpixel electrodes, and (c) after the subpixels have been written, varying the potential of voltage controlling capacitor lines for the odd-numbered rows to modulate the potentials of the subpixel electrodes in the odd-numbered rows; and
  in the second field, (d) sequentially scanning the subpixels in even-numbered rows in the unit pixels, (e) applying an image signal to the subpixel electrodes, and (f) after the subpixels have been written, varying the potential of voltage controlling capacitor lines for the even-numbered rows to modulate the potentials of the subpixel electrodes in the even-numbered rows.

32. The method of driving a liquid crystal display device comprising:
  driving the device by the method of claim 31 to perform an interlaced scan when the device is in a still picture display mode; and
  driving the device by progressive scan when the device is in a moving picture display mode.

* * * * *